United States Patent [19]
Gross et al.

[11] Patent Number: 5,802,253
[45] Date of Patent: Sep. 1, 1998

[54] EVENT-DRIVEN RULE-BASED MESSAGING SYSTEM

[75] Inventors: Kevin C. Gross, Belmont; Charles J. Digate, Boston; Eugene H. Lee, Cambridge, all of Mass.

[73] Assignee: Banyan Systems Incorporated, Westboro, Mass.

[21] Appl. No.: 606,698

[22] Filed: Feb. 26, 1996

Related U.S. Application Data

[60] Continuation of Ser. No. 145,805, Oct. 29, 1993, abandoned, which is a division of Ser. No. 771,197, Oct. 4, 1991, Pat. No. 5,283,856.

[51] Int. Cl.$^6$ .................................................. G06F 15/18
[52] U.S. Cl. ........................... 395/51; 395/50; 395/60; 395/925
[58] Field of Search ........................ 395/53, 51

[56] References Cited

U.S. PATENT DOCUMENTS

| | | | |
|---|---|---|---|
| 4,106,060 | 8/1978 | Chapman, Jr. | 358/256 |
| 4,532,588 | 7/1985 | Foster | 395/200.68 |
| 4,558,413 | 12/1985 | Schmidt et al. | 707/203 |
| 4,646,235 | 2/1987 | Hirosawa et al. | 395/200.49 |
| 4,648,061 | 3/1987 | Foster | 395/200.58 |
| 4,658,370 | 4/1987 | Erman et al. | 395/76 |
| 4,713,780 | 12/1987 | Schultz et al. | 395/200.36 |
| 4,713,837 | 12/1987 | Gordon | 379/93 |
| 4,730,259 | 3/1988 | Gallant | 395/22 |
| 4,734,931 | 3/1988 | Bourg et al. | 379/93 |
| 4,763,277 | 8/1988 | Ashford et al. | 395/65 |
| 4,768,144 | 8/1988 | Winter et al. | 707/1 |
| 4,805,207 | 2/1989 | McNutt et al. | 379/89 |
| 4,809,219 | 2/1989 | Ashford et al. | 395/54 |
| 4,827,418 | 5/1989 | Gerstenfeld | 364/439 |
| 4,831,526 | 5/1989 | Luchs et al. | 364/401 |
| 4,837,798 | 6/1989 | Cohen et al. | 379/88 |
| 4,849,878 | 7/1989 | Roy | 707/200 |
| 4,860,352 | 8/1989 | Laurance et al. | 380/23 |
| 4,866,634 | 9/1989 | Reboh et al. | 395/76 |
| 4,876,711 | 10/1989 | Curtin | 379/94 |
| 4,879,648 | 11/1989 | Cochran et al. | 345/353 |
| 4,884,217 | 11/1989 | Skeirik et al. | 395/66 |
| 4,890,240 | 12/1989 | Loeb et al. | 395/51 |
| 4,891,766 | 1/1990 | Derr et al. | 395/76 |

(List continued on next page.)

OTHER PUBLICATIONS

Amadi, Dr. A.O., "Automatic Filing and Retrieval of Official Messages Using Global Mail Attributes and a Viewdata System with Symbolically Names Pages," *Office Information Systems*, Oct. 1988, pp. 11–18.

Crowston, K. and Malone, T.W., "Intelligent Software Agents," *Byte*, Dec. 1988, pp. 267–271.

Gold, E., "ETC: an AI Based Electronic Mailer," Research Notes, Computer Research Laboratory, Tektronix, Inc., P.O. Box 500, MS 50–662, Beaverton, OR 97077, DRAFT–Jun. 28, 1985, pp. 1–15 plus 10 pages consisting of References, List of Figures, and List of Tables.

(List continued on next page.)

*Primary Examiner*—Robert W. Downs
*Attorney, Agent, or Firm*—Hale and Dorr LLP

[57] ABSTRACT

A flexible, event driven and conditional rule based mail messaging system which can be transparently implemented for use in electronic mail applications. A rule mechanism is implemented having a "When-If-Then" event-driven, conditional, action-invoking paradigm or "triplet" which permits definition of a repertoire of events considered to be significant events upon which to trigger actions in the electronic mail messaging system. Each particular event may be associated with a specific mail message and/or rules to promote efficient mapping of messages, events and rules so that only rules associated with a specific event are invoked upon occurrence of the event. Only relevant rules, i.e. those associated with a satisfied event, need be further processed. A graphical user interface to a structured rule editor facilitates synthesis of rules by a user via a substantially transparent rule engine.

5 Claims, 9 Drawing Sheets

U.S. PATENT DOCUMENTS

| | | | |
|---|---|---|---|
| 4,899,136 | 2/1990 | Beard et al. | 340/706 |
| 4,902,881 | 2/1990 | Janku | 235/381 |
| 4,912,648 | 3/1990 | Tyler | 395/61 |
| 4,914,590 | 4/1990 | Loatman et al. | 704/8 |
| 4,918,588 | 4/1990 | Barrett et al. | 707/10 |
| 4,924,408 | 5/1990 | Highland | 395/50 |
| 4,931,933 | 6/1990 | Chen et al. | 705/28 |
| 4,937,036 | 6/1990 | Beard et al. | 340/706 |
| 4,939,507 | 7/1990 | Beard et al. | 340/706 |
| 4,941,170 | 7/1990 | Herbst | 379/100 |
| 4,949,278 | 8/1990 | Davies et al. | 395/11 |
| 5,063,523 | 11/1991 | Vrenjak | 395/200.53 |
| 5,103,498 | 4/1992 | Lanier et al. | 395/68 |
| 5,175,795 | 12/1992 | Tsuda et al. | 395/62 |
| 5,317,725 | 5/1994 | Smith et al. | 395/575 |

OTHER PUBLICATIONS

Greif, I. and Sarin, S., "Data Sharing in Group Work," *Massachusetts Institute of Technology, Laboratory for Computer Science*, Oct. 1986, pp. 1–10. (Note: this paper was to have appeared in in Proceedings of Conference on Computer–Supported Cooperative Work, Dec. 3–5, 1986, Austin, Texas).

Lai, K.Y., Malone, T.W., and Yu, K.C., "Object Lens: A 'Spreadsheet' for Cooperative Work," *ACM Transactions on Office Information Systems*, 1988, pp. 1–28 plus Figs. 1–11.

Lee, J. and Malone, T.W., "Partially Shared Views: A Scheme for Communicating among Groups that Use Different Type Hierarchies," *ACM Transactions on Information Systems*, vol. 8, No. 1, Jan. 1990, pp. 1–26.

Mackay, W.E.; Gardner, B.R.; Mintz, T.H.; Pito, R.A.; and Siegal, J.B., "Argus Design Specification," Copyright 1989 Massachusetts Institute of Technology, Draft: 17 Oct. 1989, pp. 1–50.

Mackay, W.E.; Malone, T.W.; Crowston, K.; Rao, R.; Rosenblitt, D.; and Card, S.K., "*How Do Experienced Information Lens Users Use Rules?*" Copyright 1989 ACM (Association for Computing Machinery), CHI'89 Proceedings, May 1989, pp. 211–216.

Malone, T.W.; Grant, K.R.; Lai, K.Y.; Rao, R.; and Rosenblitt, D.A., "The Information Lens: An Intelligent System for Information Sharing and Coordination," *Technological support for work group collarboration*, M.H. Olson (Ed.), Hillsdale, NJ: Lawrence Erlbaum Associates, 1989, pp. 65–88.

Malone, T.W.; Grant, K.R.; Turbak, F.A.; Brobst, S.A.; and Cohen, M.D., "Intelligent Information–Sharing Systems," *Communications of the ACM*, May 1987, vol. 30, No. 5, pp. 390–402.

Malone, T.W.; Grant, K.R.; Lai, K.Y.; Rao, R.; and Rosenblitt, D., "Semistructured Messages Are Surprisingly Useful for Computer–Supported Coordination," Research Contributions, *ACM Transactions on Office Information Systems*, vol. 5, No. 2, Apr. 1987, pp. 115–131.

Marshak, D.S., "Filters: Separating the Wheat from the Chaff," *Patricia Seybold's Office Computing Report*, vol. 13, No. 11, Nov. 1990, pp. 1–8.

Pollock, S., "A Rule–Based Message Filtering System," *ACM Transactions on Office Information Systems*, vol. 6, No. 3, Jul. 1988, pp. 232–254.

Press releases, newspaper and magazine articles, and pre–publication research notes relating to Beyond, Inc., and BeyondMail, dated between Oct. 17, 1989, and Sep. 24, 1991, individually listed and identified as items #1 through #33 on cover sheet entitled "Appendix A".

Product brochure entitled "BEYONDMail Personal Productivity Tool," Copyright 1991 Beyond Incorporated, consisting of one two–sided page.

Product brochure entitled "BeyondMail Electronic Mail for Productive Workgroups," by Beyond Incorporated, consisting of cover page and 6 pages of information (undated).

Putz, S., "Babar: An Electronic Mail Database," Copyright 1988 Xerox Corporation, Palo Alto, California, Xerox PARC, SSL–88–1, Apr. 1988, pp. 1–17, with attached Babar User Guide, pp. 1–30.

Rosenburg, J., Everhart, C.F., and Borenstein, N.S., "An Overview of the Andrew Message System," Jul. 1987, Copyright 1988 ACM 0–89791–245=4/88/0001/0099, pp. 99–108.

Perkins, W.A., "Adding Temporal Reasoning to Expert–System–Building Environments" Copyright 1990 IEEE Expert, Feb., 1990, pp. 23–30.

Dutta, S. "An Event Based Fuzzy Temporal Logic" Copyright 1988 IEEE pp. 64–71.

Arcidiacono, T. "Expert System On–call", Copyright 1988, PC Tech Journal, Nov. 1988, pp. 112–135.

Fischer International Systems Corporation, "Work–Flow.2000 The Business Tool for Emc$^2$/TAO", Copyright 1992.

Shark!BYTES, "Shark!mail 2.0 Workflow as Nature Intended", LANshark Systems Newsletter, vol. 3, Issue 1, Copyright Apr., 1993.

Fischer International Systems Corporation, "Workflow.2000 The Business Tool for Office Vision", Copyright 1992.

Fischer International Systems Corporation, "Emc$^2$/TAO Electronic Mail Communication Center", Copyright 1990.

N.S. Borenstein and C.A. Thyberg, "Power, ease of use and cooperative work in a practical multimedia message system," Int'l. J. Man Machine Studies, 34, pp. 229–259, Dec. 1991.

H. Penny Nii and N. Aiello, "AGE (Attempt to GEneralize): A Knowledge–Based Program for Building Knowledge–Based Programs," from Blackboard Systems, Addison–Wesley Pub. Co., pp. 251–280, Dec. 1988.

A. Barr et al., The Handbook of Artificial Intelligence, vol. IV, Addison–Wesley Pub. Co., pp. 36–50, Dec. 1989.

TICKLE STRUCTURED EDITOR

```
BEYOND EDIT RULE                                    11:31 AM
  RULE NAME: INCOMING STATUS REPORTS              RULE EDITOR
  ─WHEN──────────────────────────────────────────────────────
  NEW   ↓(ANY TYPE)   ↓  MESSAGE IN     INBOX      FOLDER
  ─IF────────────────────────────────────────────────────────
           TO:
         FROM: EFLYNN, SADAMS, KBLACK, MGOLD
           CC:
          BCC:
       STATUS: SUBJECT, WEEKLY REPORT
   ATTACHMENT:
         DATE:

TEXT:
  ( ) RECEIPT REQUESTED PRIORITY:     ↓  ( ) KEEP COPY IN:   ↓
  ─THEN──────────────────────────────────────────────────────
  MOVE MESSAGE TO "STATUS REPORTS"   FOLDER:

OPEN RULE SET: STANDARD
FORM
```

FIG. 10A

```
BEYOND EDIT RULE                                    9:50 AM
  RULE NAME: INCOMING STATUS REPORTS              RULE EDITOR
  ─WHEN──────────────────────────────────────────────────────
  NEW   ↓(ANY TYPE)   ↓  MESSAGE IN     INBOX      FOLDER
  ─IF────────────────────────────────────────────────────────
  [(FROM) IN "EFLYNN" OR (FROM) IN "SADAMS" OR (FROM) IN "KBLACK" OR
   (FROM) IN "MGOLD"] AND [(SUBJECT) MATCHES "STATUS" OR (SUBJECT)
   MATCHES "WEEKLY REPORT"]

─THEN──────────────────────────────────────────────────────
  MOVE MESSAGE TO "STATUS REPORTS"  ↓ FOLDER ;

OPEN RULE SET: STANDARD
TEXT
```

FIG. 10B

WHEN NEW MESSAGE
IF (FROM) IN "JOE" OR (FROM) IN "MARKETING"
THEN CREATE REPLY ;
    SET (TEXT) TO "I'M OUT OF THE OFFICE UNTIL 11/1/91 AT 5PM. IN AN
        EMERGENCY, CALL ANNE AT 555-1234.";
    SEND MESSAGE ;

EVENT-DRIVEN RULE-BASED MESSAGING SYSTEM

This application is a continuation of application Ser. No. 08/145,805 filed on Oct. 29, 1993, now abandoned, which is a division of U.S. Ser. No. 07/771,197 filed on Oct. 4, 1991, now U.S. Pat. No. 5,283,856.

FIELD OF THE INVENTION

The present invention relates to an electronic mail messaging system and in particular to a rule based system and rule editor for directing messages in the electronic mail messaging system.

BACKGROUND OF THE INVENTION

Rule-based systems are known which use rules, typically "If-Then" sequences, to automatically process or "filter" signal groups transmitted as messages in a computer environment or network. Such systems are generally implemented, via object oriented programming techniques, in the context of electronic mail facilities. The application of rules or the occurrence of an action is triggered upon selected criteria being met, i.e. matching of electronically established criteria occurring in a received electronically mailed message. Upon the occurrence of a received and stored mail message satisfying specified conditional criteria set forth in the "If" portion of the statement, such as the mail message being addressed from a selected addressor, the "THEN" portion of the rule or rule set will invoke some action, in some instances directing signal groups comprising the mail message to a designated file or user area. In known systems, the "If-Then" sequences can be constructed using connectors and Boolean operators resulting in relatively complex combinations within and among fields of the sequence.

In one system (ISCREEN), described in *A Rule-Based Message Filtering System* by Stephen Pollock published in ACM Transactions on Office Information Systems, Vol. 6, No. 3, July 1988, pages 232–254, electronic text mail messages are screened, decisions are made and actions taken in accordance with rules defining procedures typically implemented as part of the manual processing of information generated in an office. A user invokes a rule editor to create rules for providing instructions to the system. The rules include conditions which describe values associated with attributes of a mail message, such as who the mail message is from and/or what it is about. The rules created by the user further include actions which describe what is to be done with mail messages that match the user specified conditions. Typical actions, which in this known implementation are functions of the underlying mail messaging system, include forwarding, filing and deleting the mail message(s).

A special purpose editor invoked by the user to define rules, disadvantageously requires that a specific rule format be learned and adhered to by the user. Specified rules can only be triggered on matching mail message criteria and cannot be triggered based upon the timing of an event, such as the expiration of a time interval. Further, the system requires extensive parsing of user-specified instructions to detect instruction conflicts, completeness and consistency.

Another known system (Object Lens), disclosed in *Object Lens: A 'Spreadsheet' for Cooperative Work*, by Kum-Yew Lai et al published in ACM Transactions on Office Information Systems, 1988, provides various templates for various semi-structured objects which users define and modify to represent information about, among other things, people, tasks, products, and mail messages. Users can create displays to summarize selected information from the semi-structured objects in table or tree formats. A template-based user interface, permits users to interface with an object-oriented data base to see and change objects via interaction with familiar forms or templates. The user, via the templates, constructs conditional rules comprising "If" conditions, which upon satisfaction "Then" result in user-specified actions taking place in accordance with the specified rule(s). The "If-Then" rules can be used to group objects together and can be automatically invoked as "semi-autonomous agents" or methods invoked by the system without user intervention, specified by the user to process information in different ways. Users can create these rule-based agents to be triggered upon the condition of an occurrence, in particular upon receipt of a new mail message. Upon the "If" portion of the rule being satisfied, a further set of rules is applied to a specified collection of objects, semi-autonomously (i.e., automatically but under control by a human user).

However, limited flexibility is provided by this system which only tests occurrences as a conditional ("If") component of a rule. Considerable complexity and inefficiency is also inherent in the system which requires compound conditions ("Ifs") for event triggering, because in addition to every mail message being tested for an occurrence or event which satisfies a first rule, the mail messages must be further tested for other criteria to be satisfied before invoking the action ("Then") portion of the rule.

In addition to having limited event driven capability that results in inflexible and inefficient processing of mail messages, and requiring a user to learn fairly complex rule design and construction schemes, known systems do not have a capability to invoke or "launch" known applications via an event selective rule mechanism.

SUMMARY OF THE INVENTION

The present invention provides a flexible, efficient, event-driven and conditional rule-based system which can be transparently implemented for use, e.g. in electronic mail applications.

A rule mechanism is implemented having a "When-If-Then" event-driven, conditional, action-invoking paradigm or "triplet" which facilitates definition of a repertoire of events considered to be significant events upon which to trigger actions in a system such as an electronic mail messaging system. Particular events may be associated with a specific mail message, and/or rule(s), to promote efficient mapping of messages, events, and rules, so that only rules which monitor a specific event are invoked upon occurrence of the event. Thus, only mail messages and relevant rules (i.e., those having an associated satisfied event) need be further processed.

Further, a graphical interface is presented to the user to permit "point and click" or cursor controlled synthesis or design and invocation of an underlying structured rule editor or rule set(s), via a substantially user transparent rule mechanism. The user can invoke structured rules and rule sets without learning a complex rule language and editor.

Still further, the rule mechanism has a capability to permit a user to invoke or "launch" a concurrent process or application from within the event selective rule mechanism. The action or THEN portion of a rule can specify a launch verb which provides a springboard to off-the-shelf application software, such as a spreadsheet program, word processor or the like, permitting the user to launch automatically into the application via the rule mechanism and to automatically re-enter the messaging system from the launched application.

Features of the invention include a simple user interface to an efficient, powerful and sophisticated rule based messaging system. While simple user interfaces are available which synthesize rules via the underlying structured rule editor, rule syntax permits external text editors to be used to create interfaces for importation into the system. Other features and aspects of the invention are explained in BEYONDMAIL Electronic Mail for Productive Workgroups: Rule Book; User Guide; and Administration Guide, which are incorporated herein by reference.

DESCRIPTION OF THE DRAWING

These and other features and advantages of the present invention will become more apparent in light of the following detailed description of an illustrative embodiment thereof, as illustrated in the accompanying drawing of which:

FIGS. 10a and 10b are illustrations of form mode and text mode formats for creating rules, respectively;

DETAILED DESCRIPTION

Figure 1:
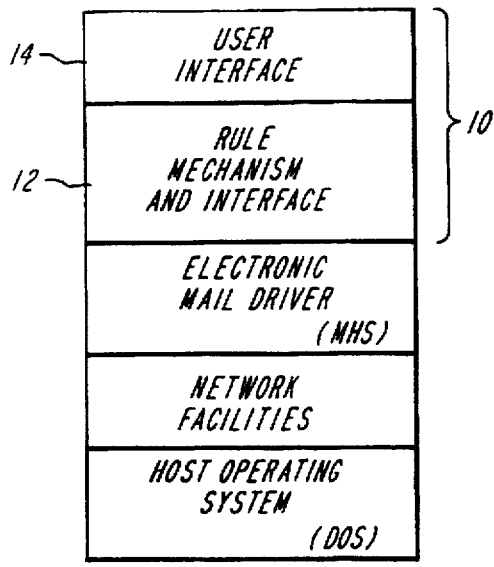
FIG. 1 is a simplified block diagram of components of a rule based message handling system.

A rule based messaging system, as illustrated in FIG. 1, is implemented in computer based systems and typically in networked personal computer systems. The personal computer system, such as an IBM PC or other computer, includes an operating system, such as Novell Netware, upon which an electronic mail application such as MHS is installed to facilitate mail message processing among computers connected via the network facilities. A rule based messaging mechanism 10, comprises a rule mechanism and interface 12 to the electronic mail application. The rule based messaging mechanism 10 is accessible to a user through a user interface 14, such as templates as known in the art or through a graphical user interface as described hereinafter.

Figure 2:
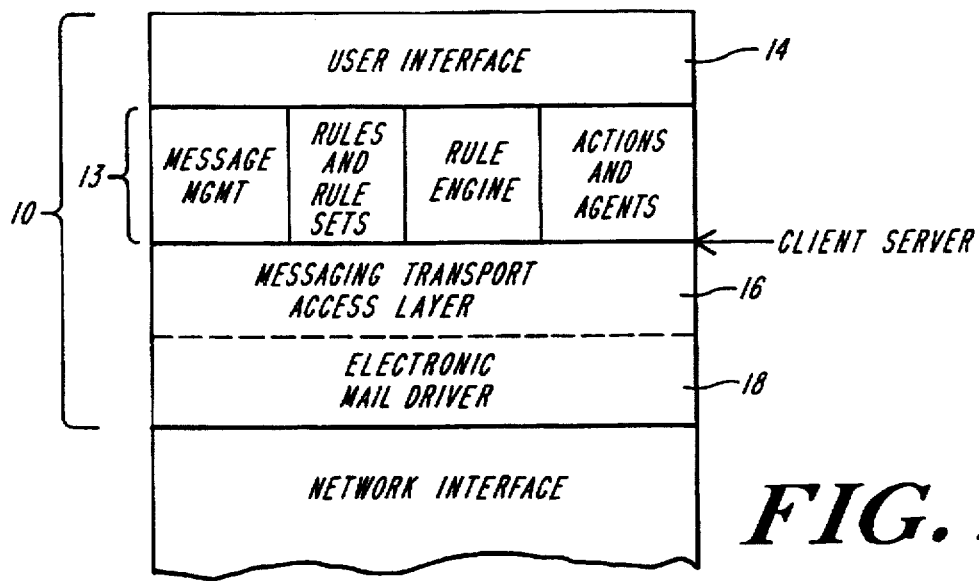
FIG. 2 is a diagrammatic representation of a client-server implementation of the rule based message handling system of FIG. 1.

In one embodiment, as illustrated in FIG. 2, a client-server architecture is implemented. Various rule mechanism resources 13 and the user interface 14 are served by a messaging transport access layer 16. In conjunction with an integral electronic mail driver component 18 available to the rule based messaging mechanism 10, the message transport access layer 16 serves as an application program interface which integrates the rule mechanism 10 with the particular electronic mail application running with the network software, facilitating mail message access between the rule mechanism resources 13 and the electronic mail application.

The rule mechanism resources 13 implement actions on a mail message (i.e. cause something to be done) based upon an evaluation of a condition, effected upon the occurrence of a particular event. The structure of every rule, whether user specified or invoked under a graphical user interface, can be diagrammed as:

WHEN(event)→IF(condition)→THEN(action).

The WHEN event field permits specification of classes of occurrences and/or various types of mail messages which will invoke the rule defined in the corresponding IF(condition)→THEN(action) fields of a specified rule. Events trigger the processing of conditions and actions and enable efficient mapping of messages, events and rules.

The events may be a function of a timer integral with the system, or a function of a folder destination of a particular message, or a function of the form of a mail message according to the mail messaging system. Various events can be specified to trigger evaluation of a condition and invocation of corresponding actions. Preferably event types will accommodate respective operands to permit further specification of relevant messages to be considered for rule invocation, to further enhance the efficiency of the rule mechanism. Event types are created and processed by an event manager using a common set of data structures and routines.

Figure 3A:
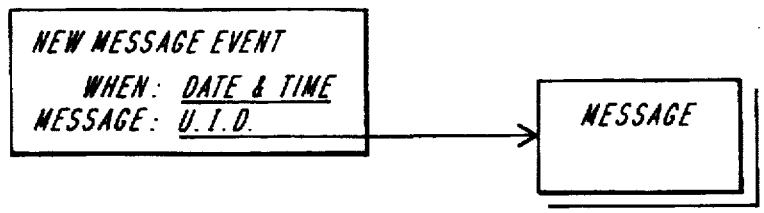
FIGS. 3a–3h are illustrations of data structures for implementing an event component of a rule in the rule based messaging system of FIG. 1.

A NEW message event type (WHEN NEW), is used to specify application of rules to a new message which has been received by the electronic mail application over a network mail transport agent (MTA) and placed in a message store. Upon receipt of a message packet from the MTA over the network interface (i.e. a NEW message), a NEW message event is created by the event manager, according to a data structure illustrated in FIG. 3a. The NEW message event is created indicating the date and time of receipt of the new message. A message identifier or unique identifier (UID) is included in the NEW event to point to the message (which may be stored using the host operating system filing facilities) associated with the NEW message event. The NEW message event is stored to an event queue to be processed as discussed hereinafter.

Upon specification for rule invocation, the NEW event can be further limited by including operands which specify a particular kind or FORM of message for application of the corresponding rule. The ultimate functionality is that a rule is triggered upon receipt of a message of a particular FORM in an Inbox or other new message initial repository.

Figure 3B:
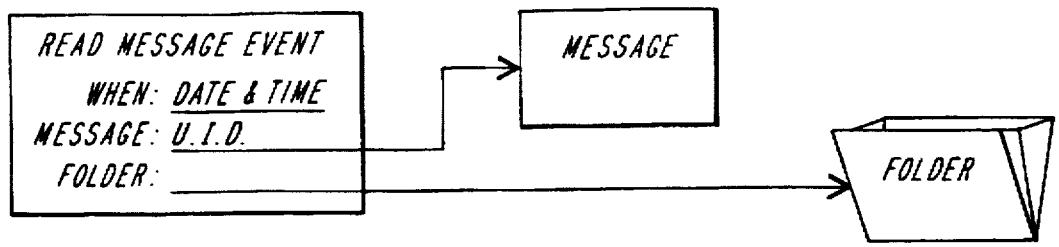

A rule can be triggered in accordance with the event portion of the rule mechanism, when a message has been read for the first time, by specifying a WHEN READ event as a limitation of a rules evaluation and application. A READ message event is created according to the data structure illustrated in FIG. 3b. In addition to the date and time when the message was first read, the READ message event is created by the event manager to have a unique identifier for the associated message. The UID includes specification of a folder, as the message may have been moved previously and reside in a folder other than the Inbox. A WHEN READ limited rule can also be further limited by specification of operands to limit the FORM of the message to which the rule is applied and to limit the application of the rule to messages in a particular FOLDER.

Figure 3C:
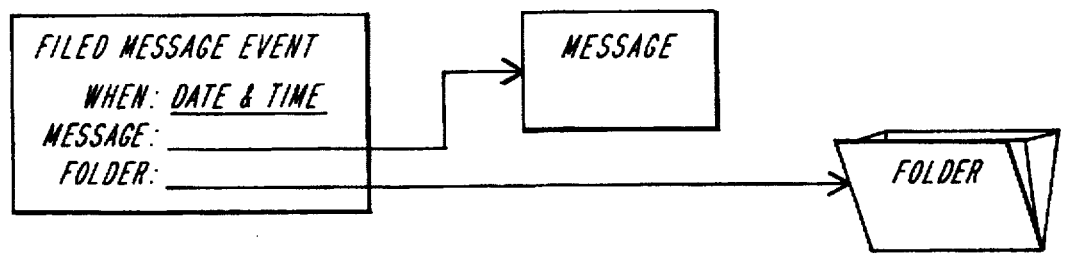

Similarly, a rule can be triggered upon a message being FILED, according to a FILED message event having an associated data structure as illustrated in FIG. 3c, which is substantially the same as the data structure for the READ message event. Optionally, as with the hereinbefore described WHEN NEW and WHEN READ limitations, the WHEN FILED rule can be limited for application to a message of a particular FORM and/or destined for a particular FOLDER.

Rule application limiting message kinds, i.e. FORMs of messages, which can be used to further limit the application of rules when the event occurrence specified is NEW, READ or FILED, is limited by the repertoire of forms (and folders) available in the messaging system. In the present illustrative embodiment, the WHEN NEW, READ and FILED event limitations can be further limited, to limit application of rules to message kinds of a FORM supported by conformance to an MHS system protocol and/or those provided for in the present mail messaging application. Message forms, which are extensible and which can be specified for further limitation of the invocation of corresponding rules include: memo, phone message, reply and request form, among others. Default settings can be established for limitations on events so that operands need not be specified.

Figure 3D:
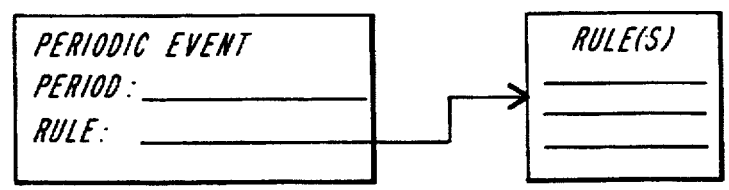

Timed events can be used to trigger a rule or rules limiting invocation of the rule mechanism. A timer is integrated with the present rule based messaging system and used to implement PERIODIC, i.e. timed, or tickler rules. Periodic occurrence triggers corresponding rules EVERY once an hour/day/week/month, as specified in the event portion of the rule. A PERIODIC event data structure, illustrated in FIG. 3d, does not point to a message, but has a rule pointer or tag which points to a rule in a rule data base for invocation of an action or sequence of actions. The periodic occurrence is limited to a specified TIMER time by providing a TIMER operand.

Figure 3E:

A TIMER event is defined in a data structure as illustrated in FIG. 3e which includes a date and time when the event is to get noticed. A UID identifies a message associated with the event and a rule pointer points to a rule in the rule data base which contains an action or sequence of actions to be taken on the message. Ticklers can be implemented in the present rule based messaging system using TIMER events. For example, the system can be instructed to move a message to a "today" folder on a specific date.

Figure 3F:
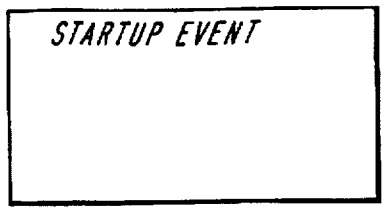
Figure 3G:
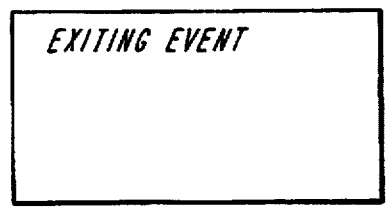

Messaging system application start-up and exiting can be specified as events to trigger rules, in accordance with data structures illustrated in FIGS. 3f and 3g. STARTUP and EXITING events are only initiated upon an event queue search at the respective occurrence. Neither occurrence requires nor permits the specification of an operand. The STARTUP event is queued and invokes corresponding rules when the messaging system processes the in-queue STARTUP event at messaging system application start-up. Similarly, the EXITING event causes rules, which match the event type, to be invoked when the messaging system is being exited.

Figure 3H:
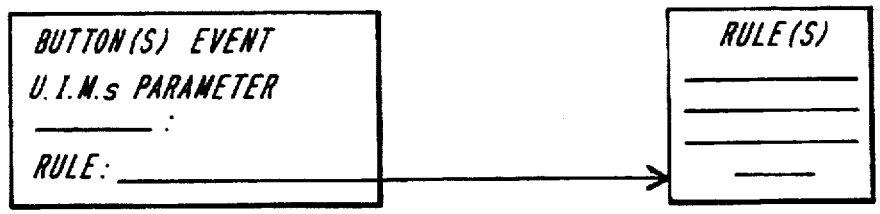

An event called a "BUTTON" event is created to sense user interface actions, such as mouse pointing and clicking. A BUTTON event type, having a data structure as illustrated in FIG. 3h, includes a user interface management system parameter, which is specified to invoke an associated rule when a user interface management system, as known in the art, senses the event occurrence or parameter specified. The data structure includes a pointer to the associated rule or rule set which contains the conditional tested and action executed upon occurrence of the BUTTON event.

Figure 3I:
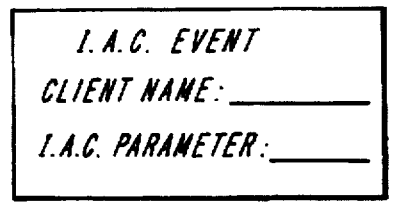
FIG. 3i and 3j are a block diagram of an inter-application communication event data structure and associated block diagram, respectively.
Figure 3J:
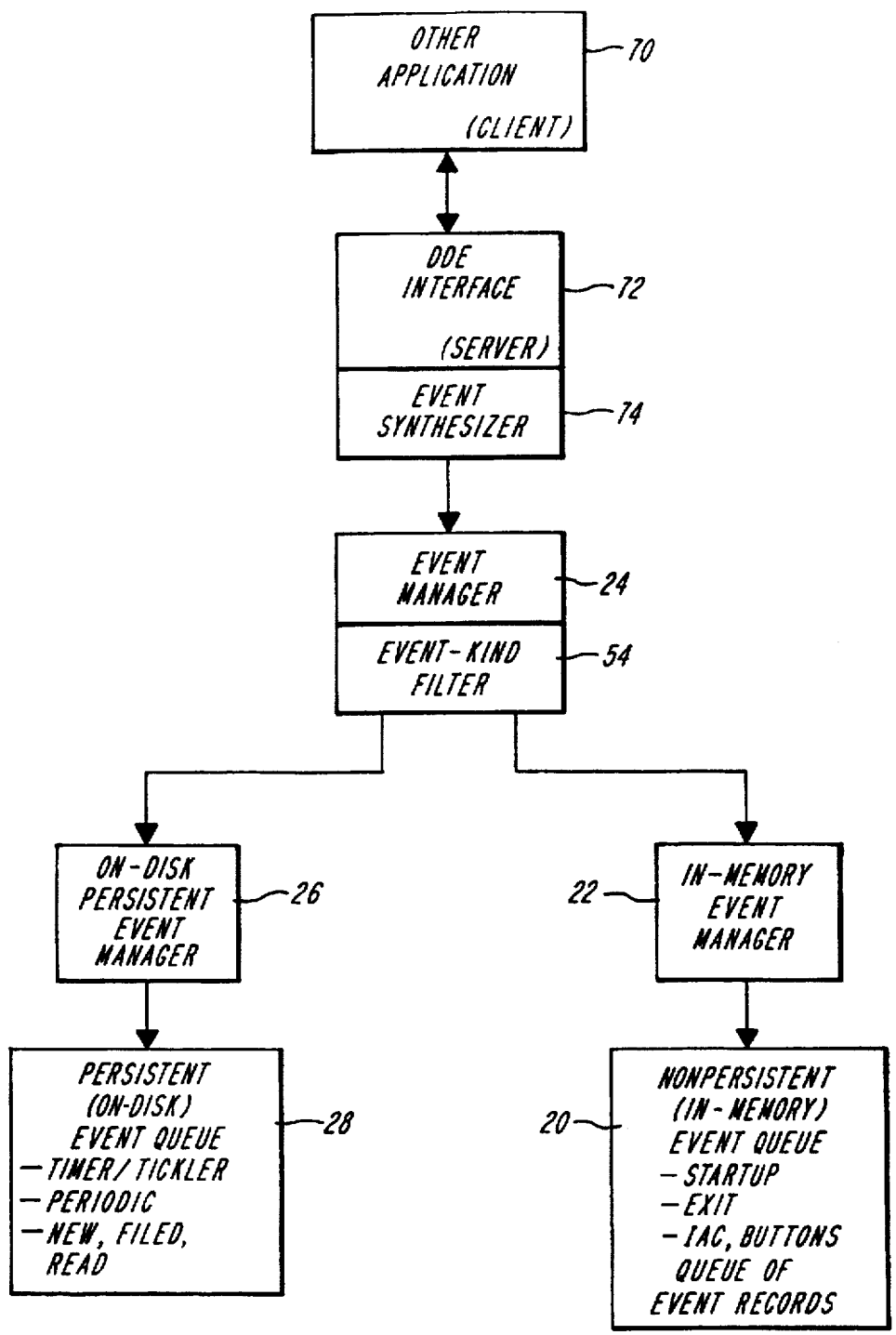

Events, according to the present invention, can be implemented to invoke IF→THEN sequences upon external occurrences. As illustrated in FIG. 3i and 3j, an event can be synthesized based on inter-application communication (IAC). Facilities are known, such as Microsoft's Windows Dynamic Data Exchange (DDE), which permit the exchange of data between disparate applications programs. Other applications, such as any client application 70 can exchange data or parameters with a DDE interface 72 which receives the data for introduction to the messaging system 10. An event synthesizer 74 component of the event manager, responsive to the DDE, creates an IAC event according to the data structure illustrated.

The data structure, FIG. 3i, of the IAC event synthesized, uses an event record which includes client information, i.e. identification of the other application 70 in communication with the DDE 72 and the event mechanism. The other application 70 typically will pass parameters to the DDE 72 which will be included in the IAC event data structure. Further, the IAC event synthesized is processed by the event manager 24 with other events as discussed hereinafter. An associated rule in the rule data base will be found and will invoke action(s) upon the occurrence of the IAC event being processed and satisfying specified conditional criteria.

Figure 4:
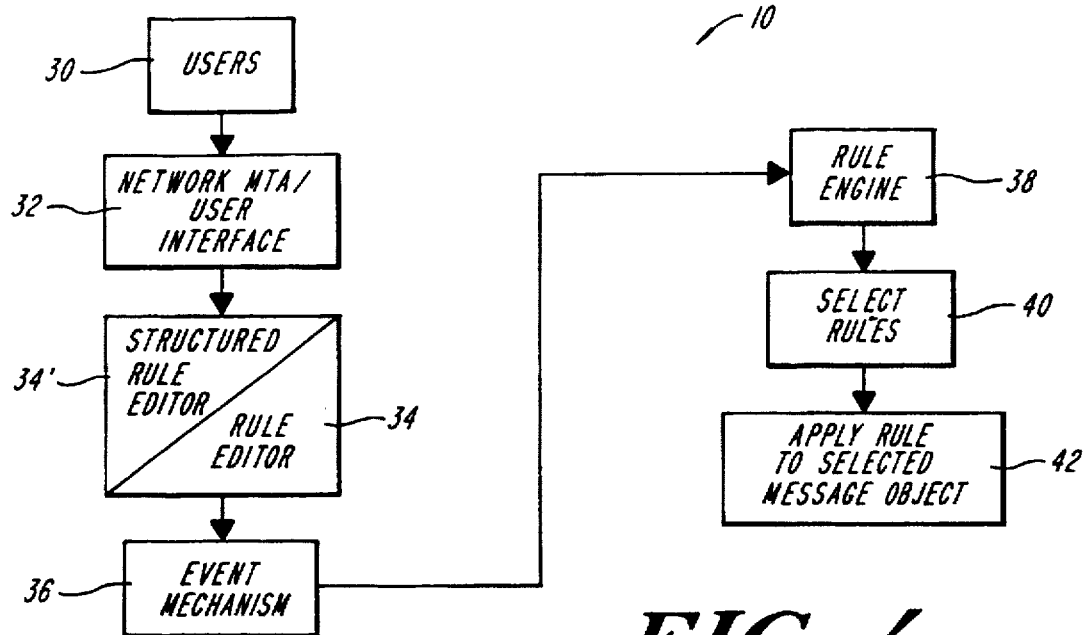
FIG. 4 is a diagrammatic representation of an event selective rule mechanism of the message handling system of FIG. 1.

The present messaging system, illustrated in FIG. 4, permits users 30 accessing the messaging application 10 through a network mail transport agent or a user interface 32 to use a rule editor 34 or structured rule editor 34, (discussed hereinafter), respectively, to invoke the event mechanism 36 which facilitates efficient mapping of messages, events and rules and assures that only relevant rules and associated messages are further processed by a rule engine 38. Selected rules 40 are then applied to selected message objects 42 to quickly and efficiently control the flow of information for the user of the mail messaging application.

Figure 5:
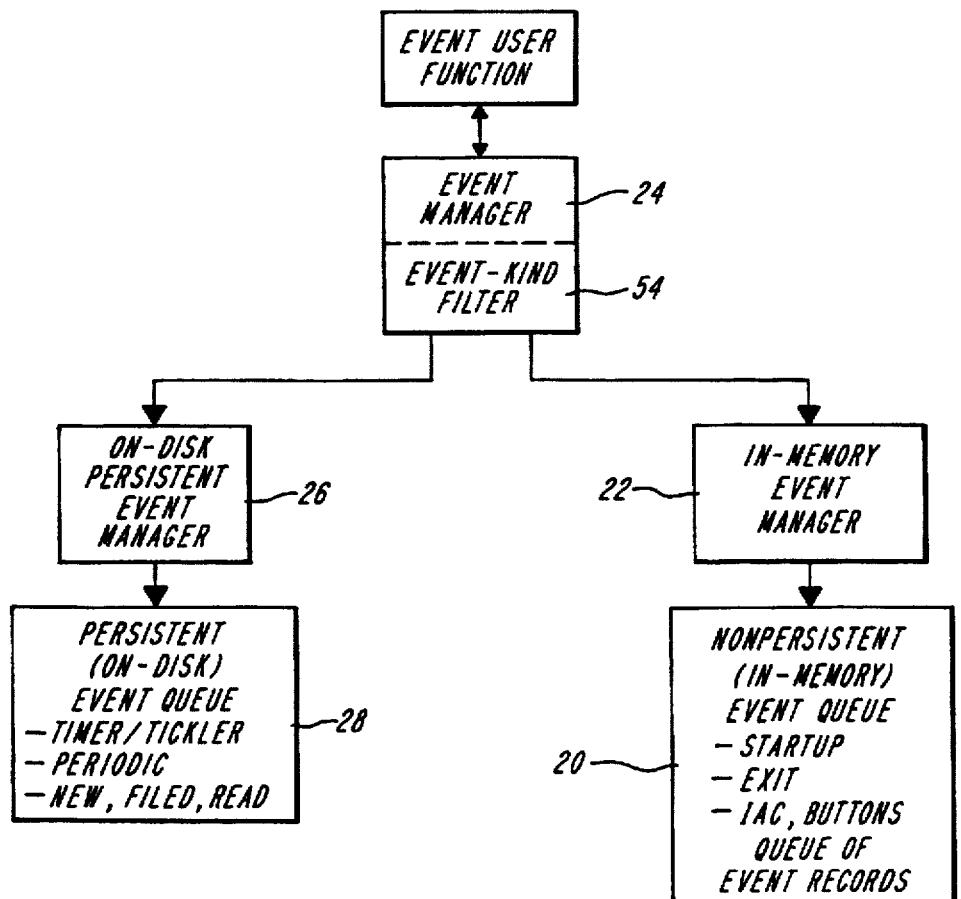
FIG. 5 is a block diagram of the event mechanism of the rule based message handling system of FIG. 1.

The event mechanism, illustrated in FIG. 5, facilitates the flexible selectivity and efficient processing of rules. The event mechanism comprises an event manager 24 which provides an application program interface for producing and storing events in accordance with the data structures discussed hereinbefore. The events described consist of two basic types, persistent and non-persistent events. Certain event kinds, including STARTUP and EXITING events, are short lived non-persistent events which will not persist across instances of messaging system application execution. Non-persistent events are implemented using a memory based technique, as illustrated in FIG. 5, in which a queue of event records 20 is maintained in memory via an in-memory event manager 22 component of the event manager 24. The non-persistent event records are fetched from and posted to the non-persistent queue 20. The in-memory event manager 22 management of the non-persistent queue assures that the in-memory non-persistent queue 20 can grow and shrink as needed.

Persistent events, such as FILED, READ, NEW, PERIODIC, and TIMER, which are likely to persist across messaging system application invocations, require a separate storage mechanism. Persistent events are stored in a persistent event queue 28 preferably maintained on disk which is accessed only by a persistent event manager 26 component of the event manager 24.

Figures 6, 7:
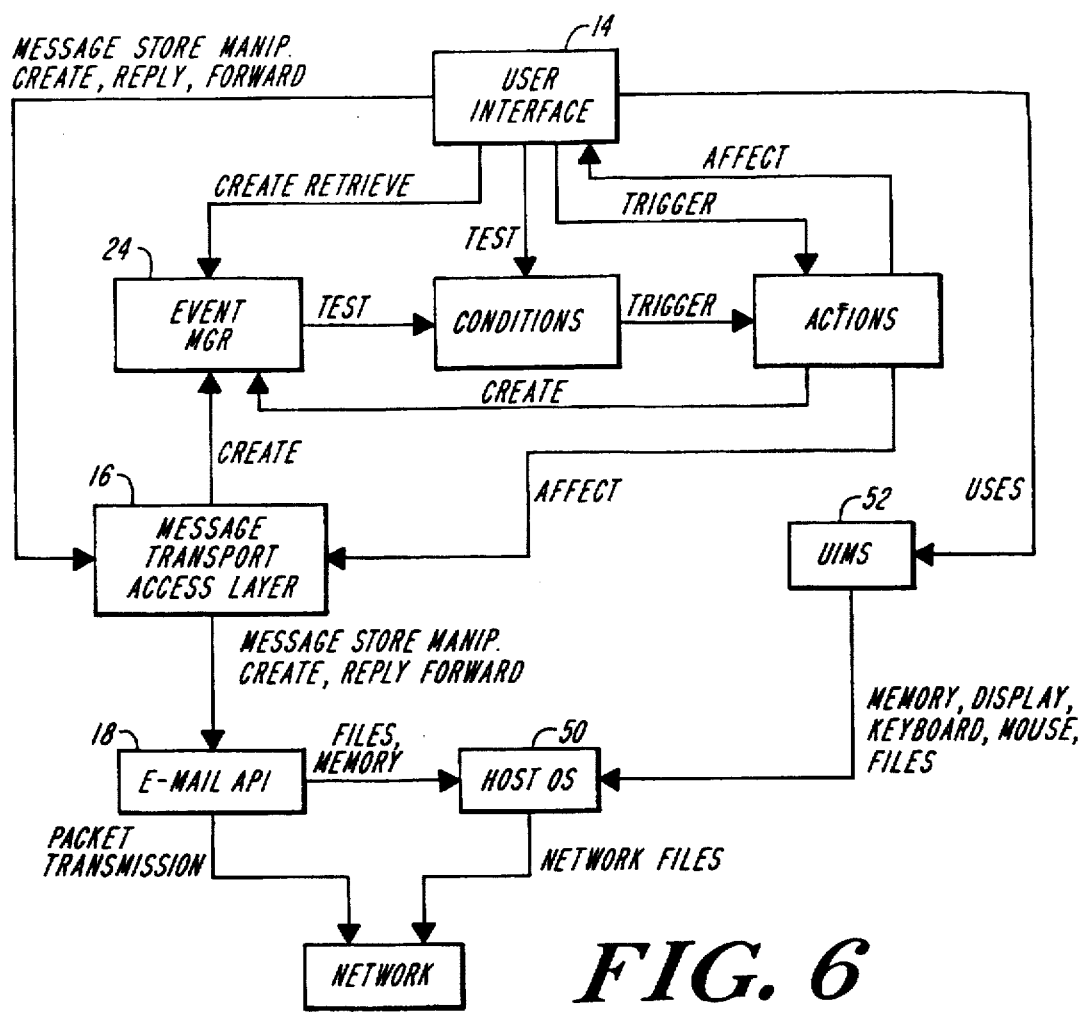
FIG. 6 is a system overview block diagram of the rule based message handling system of FIG. 1.
FIG. 7 is a graphic user interface for a tickle feature implementing a structured rule editor.

Event users or clients, such as the messaging transport access layer 16 invoking the event manager 24 via a NEW message event or such as the user interface invoking the event manager 24 via a STARTUP or EXITING event, call the event manager 24 to create events and to fetch events in the system as illustrated in the system overview of FIG. 6. The event manager 24 centralizes policy effecting event creation, consumption and storage, while minimizing the burden placed on clients.

When a new message packet is received over a network at a host having the mail messaging system according to the invention, the network informs the electronic mail application program interface (e-mail API) 18 that there is a packet of information. The e-mail API informs the messaging transport access layer 16 that there is a packet of information comprising a message. The messaging transport access layer 16 receives the information and stores the message, via the host operating system 50, as a file in a message store using the file services of the host. The message access transport layer 16 also calls the event manager 24 which creates a NEW message event in accordance with the data structure discussed hereinbefore, having the date and time received and a UID identifying the message stored. The event manager 24 invokes the persistent event manager 26 which stores the created NEW message event in the persistent event queue 28 for processing by the event manager substantially on a first-in first-out basis.

Other persistent events, i.e. FILED, READ, PERIODIC and BUTTONS, are similarly created and queued via the event manager 24 and persistent event manager 26, to be pulled off the first-in first-out persistent event queue 28 to be processed. However, in these cases the user interface 14 is the client of the event manager 24. The user interface 14, in conjunction with a user interface management system 52 (UIMS) as known in the art, monitors occurrences such as the keystrokes or buttons indicative of filing, reading or otherwise manipulating a message, and invokes the event manager 24 and persistent event manager 26 accordingly. In the case of the user interface 14 invoking the event manager 24 to create an event such as a non-persistent STARTUP or EXITING event, the in-memory event manager 22 is invoked which maintains an in-memory first-in, first-out non-persistent event queue 20. Created events are added at the first-in end of the queue 20 and existing events being processed by the event manager 24 are fetched from the first-out end of the queue 20.

The event manager 24 interfaces with the rest of the system and initializes the in-memory (non-persistent) event queue 20, locates and opens the disk based persistent event queue 28 and synchronizes the non-persistent and persistent queues, effectively merging the queues. The event manager 24 centralizes event policies and transparently implements event prioritization. When an event record is fetched by the event manager 24 for processing, the events are fetched from the queues in accordance with a fixed prioritization, subject to an event-kind filter 54. The event record, used for both posting and fetching events from the queue, comprises various fields including bits indicative of event kind, date/time when the event was posted, type of object for which the event was created and a variant field permitting a memory based non-persistent event to hold a handle to an appropriate object or permitting a disk based persistent event to hold an identifier for an object, e.g. a message in the message store maintained in host memory. The event-kind filter 54 effects an event or bit mask which permits the event manager 24 to fetch events of a certain kind from the queues, limiting the kind of events sought.

Events are fetched from the queue(s) using a priority scheme. Among the events enabled by the event mask (event-kind filter), the oldest event of the highest priority is returned to the event manager for processing first. Highest priority is given to STARTUP and EXITING events, while lesser priority is given the persistent events. Alternative event prioritization is possible as the primary consideration for prioritization is subtleties of the application design.

As indicated and illustrated hereinbefore, the ultimate functionality of the WHEN→IF→THEN rule based application is that: under the control of the user interface 14, the occurrence of events causes selected conditions to be tested; when satisfied, the conditions cause actions to be taken; and actions in turn may lead to the occurrence of new events. Little or no understanding of the rule mechanism and its rule language is needed by the ultimate user where a structured rule editor is designed and implemented through a graphical user interface. Structured rule editors are designed and implemented by a designer or programmer familiar with a WHEN→IF→THEN associated rule syntax. The structured rule editor implements rules so that the rule syntax and constructs are not presented to the user (i.e. the rule language, and editor, is transparent to the ultimate user), but appear to be embedded in the system beneath the graphical user interface which affects them.

An illustrative embodiment of one such structured rule editor is implemented in the context of a system resident tickler feature which enables the user to deal with received messages at a later time specified by the user. The system processes the message(s) and event(s) through automatic invocation of the rule mechanism so that the user is presented with the message to deal with at an appropriate time. Rule mechanism invocation is effected by the user through a graphical user interface.

The user selects the automatic tickle feature during reading, creating, replying or forwarding a message. A graphic user interface, as illustrated in FIG. 7, is presented having various fields available for the user to specify, which effect construction of a rule or rules according to the WHEN→IF→THEN construct discussed hereinbefore. The user is prompted by the tickler interface to specify a date and time on which the tickler will take action and to specify a folder into which the message is to be moved at the specified date and time. Optionally, the user can provide a textual reminder or note relating to the tickled message.

Figure 8:
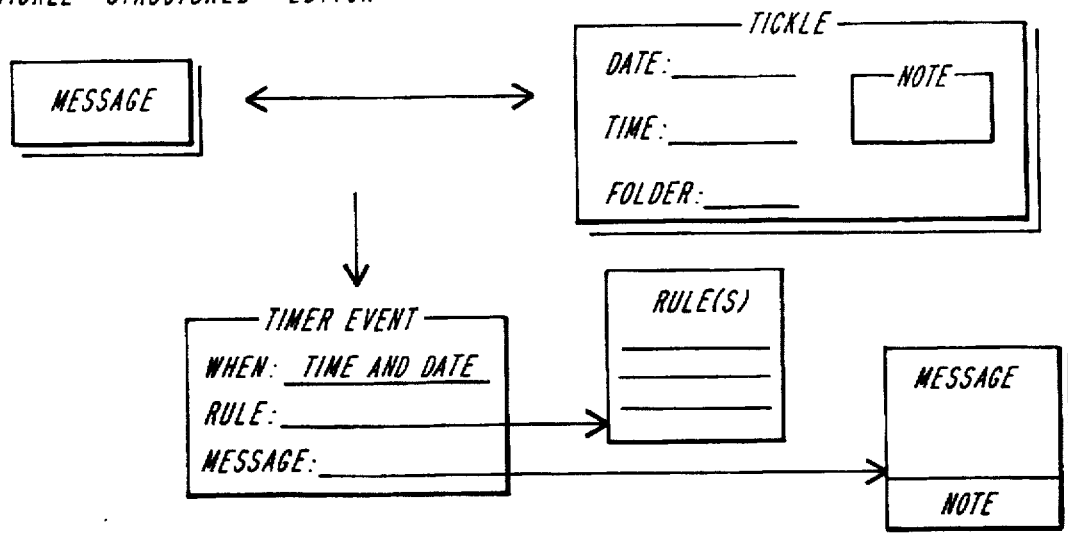
FIG. 8 is a diagrammatic representation of a tickler graphical user interface and associated event data structure.
Figure 9:
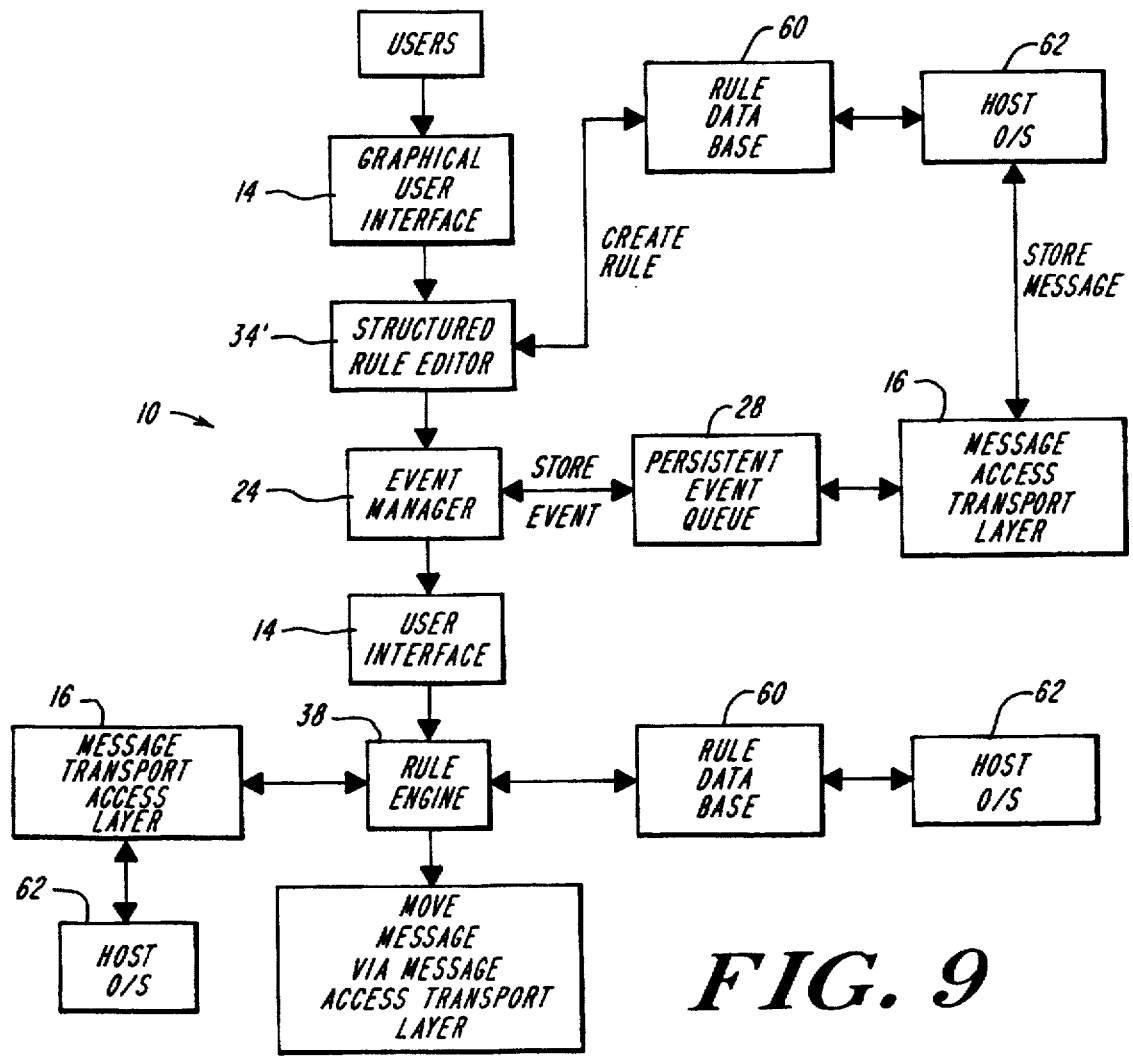
FIG. 9 is a block diagram of the rule based system of FIGS. 4 and 5 effecting a tickler feature as depicted in FIG. 8.

The user specified information entered into the tickler interface for the associated message, is used by the user interface 14 to construct a data structure, illustrated in FIG. 8, which defines an action to be invoked upon occurrence of the event, i.e. the tickle date and time. The messaging application 10 as discussed hereinbefore and illustrated in FIG. 9, processes the tickler data structure, including a pointer to the appropriate rule(s) or rule set(s), to construct the rule. The rule, including event, condition and action, is synthesized by the structured rule editor. The rule constructed by the user interface 14, via the structured rule editor 34', is stored in the rule data base 60 accessible on the host operating system 62. The rule constructed by the user interface has an event associated with it, in this case a TIMER event, which is stored by the event manager 24 in the persistent event queue 28 on disk. The event record stored in the queue points to the associated message, stored in the message store via the message access transport layer 16 and host operating system facilities 62.

When the event occurs (i.e. the specified tickler date and time arrive), the event manager 24 fetches the event from the event queue 28 and passes it to the user interface 14, which polled for the occurrence of the event(s). The user interface 14 passes the event to the rule engine 38. The rule engine 38, receiving the event data structure, illustrated in FIG. 8, looks up the event's corresponding condition-action in the rule data base 60 through the host operating system. The rule engine 38 also calls the message store via the message transport access layer 16 and host operating system, to retrieve the message associated with the event. The rule engine 38, given the event occurrence and having the rule and associated message, then executes the rule by effecting performance of the specified action, which in the case of the tickler is an action generated by the structured rule editor to move the message to the folder specified by the user in the tickler graphical user interface.

Structured rule editors can be designed within the system to reference a message (as with the tickler), or the rule syntax can be adhered to in structured rule editor designs using known external text editors (which obviously cannot reference a specific system resident message).

Within the system, rules are created in two ways according to the WHEN→IF→THEN construct. A form version of rules, as illustrated in FIG. 10a, provides the rule designer or user with a form having specific fields for the designer to fill in by selection, to create the rule(s). Field selection in the form permits the designer to interact with a user interface which partially hides syntax details from the rule designer.

An alternative rule design format, illustrated in FIG. 10b, uses a text mode within the rule editor, in which the rule designer must have familiarity with rule syntax. The more sophisticated user or rule designer can write more complicated rules using expressions having operators not available for selection in the form mode of rule design.

Still further, rule designers have an extensive open rule syntax, as set forth in Appendix I attached hereto and incorporated herein by reference, available externally for rule design. Rules can be created externally by the rule designer, via the syntax, using a text editor and then can be imported into the system for use in message manipulation by the user.

Figures 10C, 11, 11A:
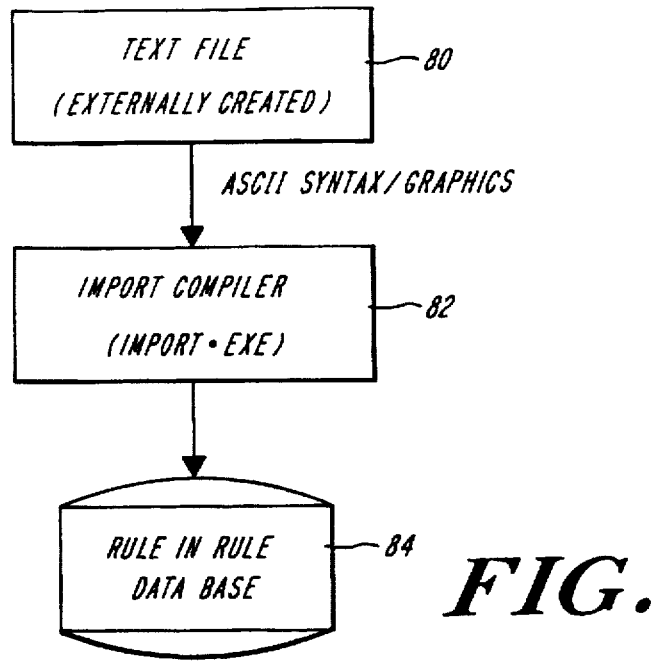
FIG. 10c is a block diagram of an external structured rule editor mode for rule creation.
FIG. 11 and 11a are a graphical user interface and underlying structured rule, respectively, for an "out of the office function".

As illustrated in FIG. 10c, a file 80 can be created and edited using an application external to the messaging system, such as Toolbook by Asymetrix Corp. The file 80, created using the referenced syntax, can include graphics and prompts to elicit responses by a messaging system user invoking the externally created rule application. The file 80 represents a structured rule editor which permits the user to invoke rules by interaction with the graphical interface and without any appreciation of rule syntax particularities. The externally text edited file 80 preferably results in an ASCII representation of the structured rule editor written according to the prescribed syntax. A messaging system importation facility 82 acts as a compiler which compiles the ASCII/syntax file 80 into a rule file 84 in accord with internally created rules. The rule file 84 is imported into the rule data base 86 for storage with other rules and for invocation upon occurrence of the event specified in the externally created rule.

Externally "prefabricated" rule sets associated with a respective graphical user interface (i.e. structured rule editors) can be used to implement various features in a rule based messaging system, such as an "out of the office" feature. The out of the office feature is a prefabricated set of rules which a user invokes to process electronic mail messages received when the user is not in the office. A simple graphical user interface and associated rule sequence are illustrated in FIGS. 11 and 11a.

When the user selects "out of the office," an interface prompts the user for information including an indication of an "until date", i.e. a date and time until which the user wants the associated rule set invoked upon occurrence of a specified event type. The user can specify a source of messages which will invoke the out of the office rule(s) and can indicate a message that should be transmitted in response to messages from the specified source(s). The out of the office interface, while apparently not a rule specification, results in the synthesis of a rule set, as illustrated in FIG. 11a.

The underlying rule set is event driven according to the invention and operative on NEW type message events only. The conditional (IF) portion of the rule is filled with parameters specified by the user in the interaction with the interface. As illustrated, the structured rule invokes an action (THEN) which creates and sends a message in reply to the messages satisfying the event and condition.

Launching of known application programs, such as spreadsheet programs, word processing programs and other applications known in the art, can also be achieved from the rule based messaging system according to the invention. Launching, or spawning another application from the executing messaging application is integrated into the rule language by the use of a "launch" verb or action specified in the THEN(condition) portion of the WHEN→IF→THEN triplet.

A file sent or received as an attachment to a mail message, can be viewed and edited in the appropriate off-the-shelf program format by invoking the application program, i.e. launching into the attachment while maintaining the rule based messaging system for re-entry. A launchable attachment is made by making a file, in an off-the-shelf application format (such as Lotus 1-2-3), an attachment to a mail message. Such a file is attached by appending a copy of the file to the desired base message.

The messaging system according to the invention has a launch action which can be specified in the triplet, such as by:

WHEN(event)→IF(condition)→THEN launch "application". The launch facility executes a known in the art memory switching program called HOLD EVERYTHING by South Mountain Software Inc., described in the Hold Everything user's manual which is incorporated herein by reference. The "application" specified with the launch verb is run on top of the messaging system, which is swapped to extended memory or disk while the application runs. Hold Everything restores the messaging system when the launched application is done. The launch verb, which can be specified for messages received having particular types of attached files for which the relevant application programs are available to the system, can be specified with parameters (i.e. "with keys") that are required as parameters or operands for the application program to be launched.

Although the invention is described in the context of a PC networked via Netware and running MHS electronic mail system, it will be appreciated by those of ordinary skill in the art that the messaging system according to the invention can be implemented via drivers and application program interfaces to various other electronic mail systems, such as DaVinci, 3+Open Mail, Banyan Vines Mail and the like.

While a particular set of "events", such as timer events, startup and exiting, etc, is disclosed herein for triggering rules for invocation, it can be appreciated that additional occurrences can be identified for establishing relevancy of a message for application of a rule, in accordance with the particulars of the underlying messaging system. Events, such as the changing of a message or the meeting of a quota, among others, can be used to trigger the application of a rule. Additionally, the system can be implemented so that user defined events can be specified.

Message objects are disclosed herein as significant data formats for implementing the present invention. However it will be appreciated that while object data structures are suitable for use in the system described, and those known in the art, other methodologies and data structures, such as structured language data records, can be used in implementing a system according to the invention.

While graphical user interfaces and structured rule editors for tickler features and out of the office replying are illustrated and described herein, it can be appreciated that other structured rule editors, created either within the messaging system or externally, can be effected to implement other features such as scheduling, resource management and the like.

While a launch verb is discussed as integrating a known memory swapping program into the messaging system according to the invention, it will be appreciated that other launching mechanisms could be implemented and that various other verbs could be used to invoke various known application programs.

Although the invention has been shown and described with respect to an illustrative embodiment thereof, it should be understood by those skilled in the art that the foregoing and various other changes, additions and omissions in the form and detail thereof may be made without departing from the spirit and scope of the invention as delineated in the claims.

APPENDIX I

Rule Syntax

The basic syntax of a BeyondMail rule is:

WHEN event  IF conditional  THEN action-list

WHEN event

The following table shows the syntax for each kind of WHEN event. Notice that each is a grammatically correct phrase. User-specifiable elements are printed in uppercase here for clarity:

| Rule Type | Syntax |
|---|---|
| New Message | when NEW FORM message in inbox folder |
| Read Message | when READ FORM message in FOLDERNAME folder |
| Filed Message | when FILED FORM message in FOLDERNAME folder |
| Periodic | when EVERY PERIOD at time TIME |
| StartUp | when START-UP |
| Exiting | when EXITING |
| Timer | when TIMER on date DATE at time TIME |

A WHEN event clause always begins with the word *when* and has no final punctuation.

The only time you need to be concerned about WHEN event syntax is when you write rules in an external text editor, as discussed later in this chapter.

IF Condition

An IF condition is a Boolean expression in the format:

if conditional

*Note:* See the end of this section for information on how BeyondMail converts IF conditions entered in fields into syntactical format.

IF Condition Syntax

The syntax requirements of an IF condition are:

- The entire IF condition is a single line or paragraph; the first word is *if*, and the condition has no final punctuation.

- If a condition has a single expression (simple or complex), that expression is not enclosed in parentheses or set off in any way:

if [From] in "EFlynn"
    if [From] in "EFlynn" or [From] in "SAdams"
    if true

- Multiple expressions are evaluated left to right. Use parentheses to force the order of evaluation:

if ([From] in "EFlynn") and ([Subject] matches "Status" or [Subject] matches "Weekly Report")

- 27 -

Rule Syntax

The basic syntax of a BeyondMail rule is:

WHEN event   IF conditional   THEN action-list

WHEN event

The following table shows the syntax for each kind of WHEN event. Notice that each is a grammatically correct phrase. User-specifiable elements are printed in uppercase here for clarity:

| Rule Type | Syntax |
|---|---|
| New Message | when NEW FORM message in Inbox folder |
| Read Message | when READ FORM message in FOLDERNAME folder |
| Filed Message | when FILED FORM message in FOLDERNAME folder |
| Periodic | when EVERY PERIOD at time TIME |
| StartUp | when START-UP |
| Exiting | when EXITING |
| Timer | when TIMER on date DATE at time TIME |

A WHEN event clause always begins with the word *when* and has no final punctuation.

The only time you need to be concerned about WHEN event syntax is when you write rules in an external text editor, as discussed later in this chapter.

IF Condition

An IF condition is a Boolean expression in the format:

if conditional

*Note:* See the end of this section for information on how BeyondMail converts IF conditions entered in fields into syntactical format.

IF Condition Syntax

The syntax requirements of an IF condition are:

- The entire IF condition is a single line or paragraph: the first word is *if*, and the condition has no final punctuation.

- If a condition has a single expression (simple or complex), that expression is not enclosed in parentheses or set off in any way:

if [From] in "EFlynn"
   if [From] in "EFlynn" or [From] in "SAdams"
   if true

- Multiple expressions are evaluated left to right. Use parentheses to force the order of evaluation:

if ([From] in "EFlynn") and ([Subject] matches "Status" or [Subject] matches "Weekly Report")

- 28 -

Typing IF Conditions

Editing and/or typing IF conditions in the IF text box frees you from the limiting assumptions BeyondMail makes when you enter values in IF condition fields by allowing you to write more complicated expressions. These expressions can also be used in nonmessage-based rules in place of the basic if true.

Here are some examples of what you can do:

- Use operators not generated automatically or that cannot be typed in IF fields using Form mode.

The most important assumption attendant on entering values in fields is that conditions in multiple fields are *and* criteria:

if ([From] in "EFlynn") and ([Cc] contains "EFlynn")

You can replace the *and* connecting the subexpressions:

if ([From] in "EFlynn") or ([Cc] contains "EFlynn")

Matching on name only is assumed on address fields (To, Cc, Bcc).

if [To] contains "Reports"

Change the default operator to look for matching names in a list.

if [To] in "Reports"

- Use additional message attributes other than form-specific field names.

For example, you can write rules that automatically respond to incoming messages when you are not in the office. If a co-worker has a similar rule set and is out at the same time as you, it's possible for your machines to create an endless loop of rule-created messages. You can forestall such an occurrence by establishing as part of the test criteria:

if [From Agent] = false

This tells BeyondMail only to execute THEN actions on a message that was not generated by a rule.

- Use functions rather than message attributes as the first part of an expression.

For example, you can write a StartUp rule that tells you something you need to know immediately. In place of true in the IF text box, you can enter this expression and then a THEN Alert action.

if countUnread ("Inbox") > 20
    alert "New mail is piling up in your inbox. Get busy.";

An IF condition like this is not restricted to nonmessage-based rules. You might want a rule that generates the same alert based on a new message coming into the Inbox folder. In this case, enter nothing in the IF fields, switch to the IF text box, and type in the condition.

Expressions Generated by Filling in IF Fields

The IF condition fields in the Rule Editor serve as a user interface designed to hide syntax from users. You can switch back and forth between the fields display and text box with the Use Text (Ctrl+T) and Use Form (Ctrl+F) commands on the Rule menu. BeyondMail converts conditions entered in fields to text before it saves a rule. These IF conditions:

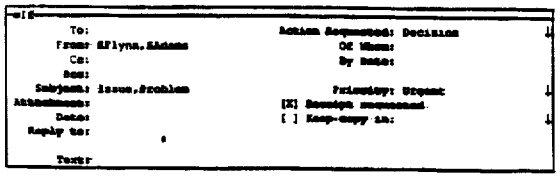

are saved in this format:

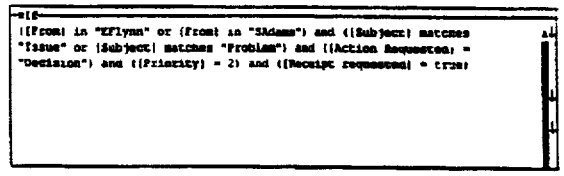

*Important* You will not be able to switch back to the fields display from the text box if the criteria you have typed or edited are more complex than could be generated in Form mode.

The IF condition expression can be simple:

if true (nonmessage-based rules)

if [From] in "EFlynn" (message-based rules)

Or it can consist of two or more subexpressions connected by an operator:

if ([From] in "EFlynn" or [From] in "SAdams")
    if ([From] in "EFlynn" or [From] "SAdams") and ([Subject] matches "issue")

Regardless of the number of subexpressions, however, an IF condition evaluates to true or false.

There are three ways to enter IF conditions:

1. Enter values in IF fields. BeyondMail makes certain assumptions and uses a subset only of the rule language capability.

2. Enter some operators along with values in fields. This goes slightly beyond the language subset used above.

3. Edit and/or type in conditions in the IF text box. Here you can use the full range of language elements.

- 30 -

The example at the beginning of this section shows most of the conditions that BeyondMail generates automatically when you enter values in IF condition fields. In addition to usernames and text in the From and Subject fields, notice that the conditions look for messages that are marked Urgent and ask for a Return Receipt.

BeyondMail takes values entered in IF fields and creates expressions in the format:

[Field] operator VALUE

[Field] is a user-visible message attribute. VALUE can be a string, integer, date/time, or Boolean, depending on what is required by the attribute.

The expression uses the following operators as appropriate:

- *in, contains,* or *matches* between the field name and the value
- *or* between expressions (multiple entries in the same field)
- *and* between multiple expressions (entries in multiple fields)

Typing Operators in IF Fields

You can also type the following operators directly into a field along with the value:

- = to specify an exact correlation

From    = EFlynn

Converts to:

[From] = "EFlynn"

- *not* to exclude the value that follows:

From    EFlynn, *not* SAdams

Converts to:

[From] in "EFlynn" or not [From] in "SAdams"

You can combine *not* with any of the other operators:

From    *not* = EFlynn

Converts to:

not [From] = "EFlynn"

- *in* to find a specific name in a list:

To    *in* Reports

Converts to:

[To] in "Reports"

- 31 -

- *between* and *and* in the Date field to specify a time period (the first date in the range must be earlier than the second):

Date    *between* 4-1-91 *and* 5-30-91

Converts to:

[Date] between 4-1-91 and 5-30-91

- The relational operators <, >, =, <>, <=, >=

Date    < noon

Converts to:

[Date] < 12:00 PM

THEN Action

A rule executes THEN actions if the IF conditions are true.

THEN Action Syntax

The base syntax of a THEN action is:

Then action-list in which action-list is one or more discrete tasks the rule performs in sequence. An action is a grammatically correct phrase that consists minimally of a verb and an object it acts on.

The phrase syntax, in fact, varies from action to action, using prepositions as necessary. For information on the syntax of each action, see Chapter 6. All you must remember is to follow the syntax presented there and be careful not to change or accidentally delete anything when adding variable clauses or otherwise editing an action.

THEN actions follow these guidelines:

- An action-list begins with the word then.

- Each action begins with a verb.

- Each action begins on a new line (BeyondMail does this automatically when you paste an action).

- Each action ends with a semicolon. The last action can take a semicolon, period, or no final punctuation.

- BeyondMail executes actions in the order in which they are entered. If it encounters an error anywhere, rule processing stops.

- Some actions can take message reference variables created by adding a clause to the basic actions. Some actions also have variations that require you to edit the phrase.

Typing THEN Actions

Basic THEN actions can be supplemented with variables, functions, and expressions. Here are some examples of what you can do.

- The Search Folder action uses complex expressions as search criteria. Remember that you are not restricted to the limited attributes and operators generated automatically by filling in IF condition fields.

Search new messages in "Urgent" folder for "[Subject] = ""important"" or [Subject] = ""critical"" or [Priority] = 2"

*Notes:* Unlike IF conditions, in THEN search actions multiple expressions are not enclosed in parentheses. An expression, regardless of how many subexpressions it has, is enclosed in quotation marks.

Strings are enclosed in a double set of quotation marks (for example, ""critical"").

In addition, search criteria expressions can use functions and variables.

- Use variable message references

This example assigns a variable message name to a rule-created message. The rule can then take information from the triggering message and include it in the new message, and then return to and act on the triggering message.

```
    create "Request" message as ReqMes;
    set [To] on ReqMes to [From];
    set [Subject] on ReqMes to "Regarding " & [Subject];
    attach "D:\SALES\Q2SALES.WR1" to ReqMes;
    send ReqMes;
    move message to "Sales Requests" folder;
    ```

Notice that the third action concatenates "Regarding" and the subject of the triggering message to form the subject of the new message. The variable here allows you to return to and act on the triggering message in the final action.

- Use variables to store values

Here's a complete StartUp rule that tells you how many phone messages you need to return. Notice it uses an expression with a function as the IF condition. The first THEN action uses a variable to hold the number of calls to make, and the second concatenates the variable with a text string that uses a select function to tell you exactly how many calls there are:

```
    when StartUp if countMessage("Phone Calls") > 0 then set numcalls to countMessage("Phone Calls");
    alert "You have " & numcalls & " phone call" & select(numcalls > 1, "s", "") & " to make."
    ```

- 33 -

- Use nonfield-specific message attributes

Filtering will put new messages in many folders. You can get a quick overview of where they are with the Show New Mail command on the View menu. It's likely, however, that you don't want to see every new message in the New Mail display. There may be unread junk mail in the Trash folder or other new but unimportant messages in other folders.

Here's a New message rule that moves incoming messages from Human Resources that are not marked urgent to a Human Resources folder. These messages are not time-critical so the first THEN action changes them from New to Read so they won't show up in Show New Mail.

> when New message in "Inbox" folder
    >
    > if ([From] in "HR") and ([Subject] matches "Policy")
    >
    > then set [Read] to true:
    > move message to "Human Resources" folder;

Writing Rules in an External Text Editor

You can create rules and rule sets in any editor that produces a text file. You can then import that text file into BeyondMail, using the import command available on either the Rule or Rule Set menu in the Rule Manager. BeyondMail uses the default extension .RUL for a rule or a rule set file. You can write multiple rules and multiple rule sets in the same file.

```
%SET Standard
%FLAGS E
%EVENT New Message
%FOLDER Inbox
%RULE Incoming Status Reports
if ([From] in "TFlynn" or [From] in "SAdams" or [From] in "KBlack"
or [From] in "WGold") and ([Subject] matches "Status" or [Subject]
matches "Weekly Report")
then move message to "Status Reports New" folder;
create "Memo" message;
set [To] to "[From]";
set [Subject] to "Status Report";
insert text "Received your status report. Thanks.";
send message;
%END
```

In addition to writing rules according to the syntax outlined in this chapter, you must adhere to the following conventions.

Each element must start in the first column of the text file; it consists of a directive word preceded by a percent sign (%).

Note in the above figure that a number of directive elements define the WHEN event particulars. These are followed by the rule name. Following this are the actual IF conditions (in paragraph form) and THEN actions (each action beginning on a new line), which have no preceding directive elements.

The directive elements are:

%SET Specifies a rule set. If you use the name of an existing rule set, the rule or rules will be imported into that set. If you use the name of a set that does not exist, import creates the set.

If you write two or more rules, you only need to enter the %SET and following %FLAGS directives once. All rules that follow go in this set until the next %SET and %FLAGS directives.

Even if you are writing a single rule, you must include a rule set directive and set name.

%FLAGS The number specifies the flag bits for the current rule set. User-defined rules and sets should use either %FLAGS 0 (disabled) or %FLAGS 1 (enabled). %FLAGS 3 through 7 are reserved for system use.

%EVENT Specifies the rule type or class. The available types are:

| New Message | Timer |
|---|---|
| Read Message | StartUp |
| Filed Message | Exiting |
| Every | |

The specific directives that immediately follow the %EVENT are determined by the directive type.

For a message-based rule:

%FORM Optional. Defines the message form acted on by the rule. If not entered, the rule works on all messages (Any type).

%FOLDER Optional. Defines the folder in which the rule looks for messages. If not entered, the rule assumes "Inbox".

For periodic (Every) and Timer rules:

%PERIOD Defines the period at which the rule acts. The available types are:

| Hour | Month | Tuesday | Thursday | Saturday |
|---|---|---|---|---|
| Day | Monday | Wednesday | Friday | Sunday |

%TIME Optional. Defines the time within the period at which the rule acts.

StartUp and Exiting rules have no event-specific directives.

*Note:* If you are writing a series of rules with the same event type, you do not need to repeat the %EVENT and subsequent %EVENT-specific directives for the second and following rules. Begin the subsequent rules with the %RULE directive.

- 35 -

%RULE    Names the rule. Remember that two rules in the same set cannot have the same name.

%END     Required end-of-file marker.

> Note: If you export the Standard rule set, you may see additional data following the %END directive. This is system-wide information. You needn't be concerned with it.

Rule Language Functions

This section describes all BeyondMail builtin functions. Functions are listed below by group as they appear when you select Paste Function from the Rule menu or press Ctrl+U in the Rule Editor.

| Messaging Functions | Type Functions | Number Functions |
|---|---|---|
| countMessages | isBlank | abs |
| countUnread | isDate | average |
| folders | isDateTime | min |
| message | isList | max |
| searchCount | isNumber | mod |
|  | isText | sign |
|  | isTime | sum |
|  |  | value |

| String Functions | String Functions | List Functions |
|---|---|---|
| char | lower | choose |
| clear | repeat | isMember |
| code | string | list |
| mid | trim | count |
| find | upper | index |
| length |  |  |

| Date and Time Functions | | |
|---|---|---|
| adjust | hour | second |
| date | minute | timeValue |
| datetimeValue | month | today |
| dateValue | now | year |
| day |  |  |

| Naming Functions | Miscellaneous Functions | |
|---|---|---|
| address | alert2 | environment |
| expand | alert3 | exists |
| username | clock | info |
| nameKind | errorLevel | select |
| minUsername |  |  |

The syntactical paradigm for a function is:

functionName ([argument:type {,argument:type}...]) : return value of type

| | |
|---|---|
| functionName | Name of the BeyondMail function; this name is *not* case-sensitive. All functions are available from the Rule menu Paste Function command. |
| argument | A function uses its arguments to return a value. An argument can be a single value ("Inbox" for example) or an expression (N * 2 + 1 for example). The arguments are evaluated before the function is called. In the syntax models, a label, more definitive of the nature of the argument (for example, name, dividend, index, when), replaces the generic *argument*. |
| type | Type describes the expected data type of the argument. T means type can be any of the acceptable data types. If necessary, BeyondMail converts (coerces) an argument into the correct type. |
| return value of type | Each function, after evaluating the specified argument(s), returns a value of a specific data type. T means type can be any of the acceptable data types. |

Notational conventions are as follows:

| Notation | Means |
|---|---|
| () | Parentheses are significant: a function that takes no arguments expects an empty pair of parentheses. |
| : | Colons are not significant: they appear in syntax merely to distinguish argument from type and argument(s) from return value. |
| [...] | Anything enclosed in brackets is optional. |
| {...} | Anything enclosed in curly braces can be repeated zero or more times. |
| , | A comma separates elements in an argument list. |
| \| | A vertical bar indicates alternates. |
| list x | Indicates a value that is a list of values of the type following. |
| => | A double arrow indicates the returned value in examples; not intended to suggest syntax. |
| <...> | Angle brackets describe a list literal in examples; not intended to suggest syntax. | abs

| | |
|---|---|
| paste format | abs (N) |
| syntax | abs (aValue:integer) : integer |
| definition | Returns the absolute value of the expression, which must be coercible to an integer. |
| example | abs (3-4) => 1 | address

| | |
|---|---|
| paste format | address ([From]↓) |
| syntax | address ([name:string]) : string |
| definition | Returns a string value that is the email address of a user; if no name is specified, returns the address of the logged-in user. Returns the original string if the specified name is unknown or otherwise unrecognized as a recipient's name or alias. |
| example | address () => YSilk @ beyond<br>address ("MGold") => MGold @ beyond |

- 37 - adjust

| | |
|---|---|
| paste format | adjust ([Date]↓,YEARS, MONTHS, DAYS, HOURS, MINUTES, SECONDS) |
| syntax | adjust (when:datetime, yearIncrement:integer, monthIncrement:integer, dayIncrement:integer, hourIncrement:integer, minuteIncrement:integer, secondIncrement:integer) : datetime |
| definition | Adjusts the specified date and time by the amount in each succeeding argument by the increment specified in each argument (each of the latter can be either positive or negative). Datetime must be a single value and not a range. |
| | *Note:* Although increments are specified from the largest (year) to the smallest (second), the operation is actually performed in reverse order. This allows for the natural occurrence of "carry-over" date arithmetic. |
| example | adjust (10/31/90,2,2,2,2,2,) => 1-2-93 2:02 AM | alert2

| | |
|---|---|
| paste format | alert2 ("TITLE", "TEXT", "OK TEXT", "CANCEL TEXT", FOCUS) |
| syntax | alert2 (title:string, text:string, accept:string, reject:string, position:integer) : boolean |
| definition | displays an onscreen alert box with title, message, and accept/reject text. *Integer* is the initial position of the focus: it can be 1 for F10 or 2 for Esc. Returns true if F10 is pressed or clicked, otherwise false. |
| example | if alert2 ("Empty Trash", "Do you want to empty trash?", "Yes", "No", 2) => true (if F10 selected) | alert3

| | |
|---|---|
| paste format | alert3 ("TITLE", "TEXT", "F6 TEXT", "OK TEXT", "CANCEL TEXT", FOCUS) |
| syntax | alert3 (title:string, text:string, action:string, accept:string, reject:string, position:integer) : integer |
| definition | displays an onscreen alert box with title, message, and action/accept/reject text. *Integer* is the initial position of the focus: it can be 1 for F10, 2 for Esc, or 3 for F6. Based on which is pressed or clicked, returns 1 for F10, 2 for Esc, or 3 for F6. |
| example | alert3 ("To Do", "A message has come into your To-Do folder", "Goto To Do", "Print Message", "Ignore it", 3) => 3 (if F6 selected) | average

| | |
|---|---|
| paste format | average (N1, N2, N3,....) |
| syntax | average (aValue:integer{,anotherValue:integer}...) : integer |
| definition | Returns the average of the expressions, each of which must be coercible to an integer. If a single expression is specified and it is a list, returns the average of the list contents. |
| example | average (6, 2) => 4 | char

| | |
|---|---|
| paste format | char (N) |
| syntax | char (code:integer) : string |
| definition | Uses the expression's integer value to return a single-letter string encoded by that value in the current machine's character set. Returns an empty string if the integer is 0 or greater than 255. |
| example | char (65) => "A" |

- 38 - choose

| | |
|---|---|
| paste format | choose (INDEX, LIST) |
| syntax | choose (selector:integer, aList:list x T) : T<br>choose (selector:integer, element1:type|,element2:type|...) : type |
| definition | Evaluates the first argument, *selector*, which is then used as an index to the second argument. The second argument is either a (1-based) list argument or a list of elements from which the indicated element is chosen.<br><br>Returns the message "Error choosing element from list: index is out of range" if *selector* is less than zero or greater than the number of elements in the second argument. |
| example | choose (1, [Attachment]) => [first attachment name]<br>choose ([priority] +1, ("low, regular, urgent")) => "regular" |

*Note:* The first example demonstrates how to use this function to extract an attachment from a list when you don't know the name of the attachment.

clear

| | |
|---|---|
| paste format | clear ("STRING") |
| syntax | clear (source:string) : string |
| definition | Returns a string comprised of the source string with nonprintable characters removed. A Tab character is replaced by a single space. (Nonprintable characters are determined by the current machine's character set.) |
| example | clear ("pr^^i^nt^ou^^^t") => "printout" (where ^ represents nonprintable characters) | clock

| | |
|---|---|
| paste format | clock () |
| syntax | clock () |
| definition | Returns the elapsed time (in milliseconds) the current user has been running BeyondMail. |
| example | clock () => 3000 | code

| | |
|---|---|
| paste format | code ("S") |
| syntax | code (aString:string) : integer |
| definition | Uses the expression's string value to return the code point value of the string's first letter; mapping uses the current machine's character set. |
| example | code ("A") => 65 | count

| | |
|---|---|
| paste format | count (LIST) |
| syntax | count (aList:list) : integer |
| definition | Returns the number of elements in a list. |
| example | count (list("EFlynn","SAdams","KBlack","MGold")) => 4<br>count ([To]) => number of addressees in the To field of the current message | countMessages

| | |
|---|---|
| paste format | countMessages ("Inbox"↓) |
| syntax | countMessages (folder:string) : integer |
| definition | Returns the number of messages in a specified folder. Can be used to establish criteria upon which to trigger some action or in string concatenation to pass the returned value. Returns 0 if the specified folder does not exist. |
| example | If countMessages("Phone") > 10 | countUnread

| | |
|---|---|
| paste format | countUnread ("Inbox"↓) |
| syntax | countUnread (folder:string) : integer |
| definition | Returns the number of unread messages in a specified folder. Can be used to establish criteria upon which to trigger some action or in string concatenation to pass the returned value. Returns 0 if the specified folder does not exist. |
| example | alert ("There are " & countUnread("Phone") & " new phone messages in your Phone folder."); | date

| | |
|---|---|
| paste format | date (YEAR, MONTH, DAY) |
| syntax | date (year:integer, month:integer, day:integer) : datetime |
| definition | Calculates the date as of midnight of the specified day. |
| example | date (91, 5, 11) => 5-11-91 12:00 AM | datetimeValue

| | |
|---|---|
| paste format | datetimeValue ("STRING") |
| syntax | datetimeValue (aString:string) : datetime |
| definition | Returns a date/time value from a date and time string representation. |
| example | datetimeValue ("today") => 5-23-91 12:00 AM<br>datetimeValue ("tomorrow noon") => 5-24-91 12:00 PM | dateValue

| | |
|---|---|
| paste format | dateValue ([Date]↓) |
| syntax | dateValue (aString:string) : date |
| definition | Returns a date value from a date and time string representation. |
| example | dateValue ("5/15/91") => 5-15-91 | day

| | |
|---|---|
| paste format | day ([Date]↓) |
| syntax | day (when:datetime) : integer |
| definition | Returns the day portion of a date/time value as an integer in the range 1 through 31. |
| example | day (today ()) => 11 | environment

| | |
|---|---|
| paste format | environment ("NAME") |
| syntax | environment (aString:string) : string |
| definition | Returns the string value of a DOS environment setting. The argument is case-insensitive. If no matching DOS environment setting is found, returns an empty string. |

| | |
|---|---|
| example | environment ("comspec") => "c:\config.sys"<br>environment ("lastdrive") => "z:"<br>environment ("path") => "c:\;c:\dos;z:\;w:\beyond\bmail" | errorLevel

| | |
|---|---|
| paste format | errorLevel () |
| syntax | errorLevel () |
| definition | Returns the DOS exit code of the most recently launched application or attachment. |
| example | alert select (errorLevel() > 0, "Failed", "Succeeded"); | exists

| | |
|---|---|
| paste format | exists ("ANY", "NAME") |
| syntax | exists (kind:string, name:string) : boolean |
| definition | Returns true if a name of the specified kind exists. Kind is one of the following string values: "user" (username or alias in a public or private address book), "folder" (system or user-created folder), "file" (DOS file name, which can include its path), or "any" (that is, any user, folder, or file). |
| example | exists ("folder", "Inbox") => true<br>exists ("file", "c:\autoexec.bat") => true | expand

| | |
|---|---|
| paste format | expand ([From]↓) |
| syntax | expand (name:string[,private:boolean][,public:boolean]) : list |
| definition | Used to expand a group or distribution list. Returns a list of names. The argument, name, is an address book entry. Indicate whether the private or public address book is to be searched. The default is to search both. |
| | Returns the original string if the specified name is not found or is not the name or alias of a distribution list. |
| example | expand("Sales")  => <"EFlynn","SAdams","KBlack","MGold"> | false  A built-in value.

find

| | |
|---|---|
| paste format | find ("FIND WITHIN STRING", "WITHIN") |
| syntax | find (target:string, source:string [,startAt:integer]) : integer |
| definition | Calculates the (1-based) offset in the target string of the source string to return the index of the first letter. If the optional position is specified, searching begins there and ignores prior candidates. If this position is greater than the length of the target string, returns 0. The search is case-insensitive. |
| example | find ("barbaric", "bar") => 1<br>find ("barbaric", "bar", 2) => 4 | folders

| | |
|---|---|
| paste format | folders ("ALL") |
| syntax | folders ([type:string]) : list x string |
| definition | Returns a list of folders, where type can be "all" (all folders), "system" (system folders only), or "user" (user-created folders only). A null string returns all folders. |
| example | folders ("user") => <"boss","doc","news","urgent"> | hour

| | |
|---|---|
| paste format | hour ([Date]↓) |
| syntax | hour (when:datetime) : integer |
| definition | Returns the hour of the day as an integer in the range 0 through 23. |
| example | hour (12:00 AM) => 0<br>hour (11:00 PM) => 23 | index

| | |
|---|---|
| paste format | index (ELEMENT, LIST) |
| syntax | index (element:T, aList:list x T) : T |
| definition | Returns the index (offset) of the element within the list; comparison is case-sensitive. Returns 0 if nothing is found. |
| example | index (2, list (4, 5, 6, 2, 3)) => 4 | info

| | |
|---|---|
| paste format | info ("INFOTYPE") |
| syntax | info (selector:string) : string |
| definition | Returns information about the BeyondMail execution environment. Currently supports the following selectors:<br><br>Selector    Returns<br>directory    The current file system directory for data files.<br>version    The release number of BeyondMail (currently 1.0). |
| example | info ("directory") => "C:\BMAIL"<br>info ("version") => "1.0" | isBlank

| | |
|---|---|
| paste format | isBlank (VALUE) |
| syntax | isBlank (aValue:value) : boolean |
| definition | Returns true if the argument is uninitialized or empty, false otherwise. |
| example | isBlank ([cc]) => true (if no value is bound to cc) | isDate

| | |
|---|---|
| paste format | isDate (VALUE) |
| syntax | isDate (aValue:value) : boolean |
| definition | Returns true if the argument is a valid date, false otherwise. Checks that string format and content are correct. |
| example | isDate ("1-1-90") => true<br>isDate ("1-1-90 11:00 am") => false | isDateTime

| | |
|---|---|
| paste format | isDateTime (VALUE) |
| syntax | isDateTime (aValue:value) : boolean |
| definition | Returns true if the argument is a valid date/time, false otherwise. Accepts a date string, a time string, or both. If a date is not specified: uses the current date. If a time is not specified: uses midnight. Checks that string format and content are correct. |
| example | isDateTime ("1-1-90") => true<br>isDateTime ("10 am") => true<br>isDateTime ("1-1-90 13:00 am") => false | isList

| | |
|---|---|
| paste format | isList (VALUE) |
| syntax | isList (aList:value) : boolean |
| definition | Returns true if the argument is a list. |
| example | isList ({to}) => true<br>isList ({from}) => false | isMember

| | |
|---|---|
| paste format | isMember (ELEMENT, LIST) |
| syntax | isMember (key:value, source:list x T) : boolean<br>isMember (subList:list x T, superList:list x T) : boolean |
| definition | In the first format, returns true if the list specified as the second argument contains the single element specified as the first argument. In the second format, returns true if the first list argument is a proper subset of the second list argument (that is, if all subList elements are contained in superList). Comparison is case-sensitive. |
| example | isMember ({From}, expand("marketing")) => true (if the sender is in the marketing distribution list)<br>isMember (list ("sales","support"), list ("marketing", "sales","qa")) => false | isNumber

| | |
|---|---|
| paste format | isNumber (VALUE) |
| syntax | isNumber (aValue:value) : boolean |
| definition | Returns true if the argument is a valid integer, otherwise false. Evaluates any string that contains an integer. |
| example | isNumber ("234") => true<br>isNumber (1 + 2) => true<br>isNumber ("2 if by sea") => false | isText

| | |
|---|---|
| paste format | isText (VALUE) |
| syntax | isText (aValue:value) : boolean |
| definition | Returns true if the argument is a string data type, otherwise false. |
| example | isText ("number") => true<br>isText (123) => false | isTime

| | |
|---|---|
| paste format | isTime (VALUE) |
| syntax | isTime (aValue:value) : boolean |
| definition | Returns true if the argument is a valid time, otherwise false. Checks that string format and content are correct. |
| example | isTime ("10 am") => true<br>isTime ("13:00") => true<br>isTime ("noon") => true<br>isTime ("13:00 am") => false<br>isTime ("25:00") => false<br>isTime ("tomorrow") => false | length

| | |
|---|---|
| paste format | length ("STRING") |
| syntax | length (aString:string) : integer |
| definition | Returns the number of letters in the argument, which is coercible to a string or text. While this string argument is considered long text (it can be up to 32 kilobytes), string concatenation is required for literal strings longer than 255 characters. |
| example | length ("word up") => 7<br>length (6 + 7) => 2 | list

| | |
|---|---|
| paste format | list ("S1", "S2", "S3",...) |
| syntax | list (aValue:T {, anotherValue:T}...) : T |
| definition | Returns a list derived from one or more arguments; type is that of the first element. |
| example | list (1, 2, 3) => <1, 2, 3><br>list ("EFlynn", "SAdams", "KBlack") => <"EFlynn", "SAdams", "KBlack"> | lower

| | |
|---|---|
| paste format | lower ("STRING") |
| syntax | lower (aString:string) : string |
| definition | Converts all letters in the string argument to their lowercase equivalent. |
| example | lower ("Time's Up") => "time's up" | max

| | |
|---|---|
| paste format | max (N1, N2, N3, ...) |
| syntax | max (aValue:integer {,anotherValue:integer}...) : integer |
| definition | Returns the maximum value of the expressions, each of which must be coercible to an integer. If a single expression is specified and it is a list, returns the maximum value of the list contents. |
| example | max (2, "3") => 3 | message

| | |
|---|---|
| paste format | message ("Inbox"↓, INDEX) |
| syntax | message ({folder:string {,index:integer}}) : reference |
| definition | Creates a message reference. The first argument is a folder name. The second argument, which can be specified only if the first is also specified, is an index (1-based) to messages in the folder. If only a folder name is specified, returns a reference to the first message in that folder. If no arguments are specified, returns a reference to the first message in the current folder.<br><br>Returns the message "Folder not found" if the named folder does not exist. Returns "Message not found" if the integer is greater than the number of messages in the folder, or "A function argument was not valid" if it is less than 1. |
| example | message () => the first message in the current folder<br>message ("dump", 4) => the fourth message in the dump folder |

- 44 - mid

| | |
|---|---|
| paste format | mid ("STRING", START, LENGTH) |
| syntax | mid (source:string, start:integer [, length:integer]) : string |
| definition | Returns a string up to *length* letters: string is that found at (1-based) offset *start* within *source* and continuing until enough letters have been scanned or the end of the string is reached.<br><br>If *start* is greater than the length of the source string, or if *length* is less than 1, returns an empty string. If *start* is less than 1, it is set to 1. If *length* is not specified, all letters from *start* offset to the end (maximum 255) are taken. |
| example | mid ("Apples and Pears", 12, 5) => "Pears" | min

| | |
|---|---|
| paste format | min (N1, N2, N3, ...) |
| syntax | min (aValue:integer [,anotherValue:integer]...) : integer |
| definition | Returns the minimum value of the expressions, each of which must be coercible to an integer. If a single expression is specified and it is a list, returns the minimum value of the list contents. |
| example | min (1, 2, 3) => 1 | minUsername

| | |
|---|---|
| paste format | minUsername () |
| syntax | minUsername ([address:string]) : string |
| definition | Returns the minimal portion of the specified address necessary to establish uniqueness within the local environment. If no argument is entered, returns the name of the current user. Strips the workgroup component from an MHS address if the workgroup is the same as that of the current user. |
| example | minUsername ("EFlynn") => "EFlynn"<br>minUsername ("YSilk @ beyond") => "YSilk @ beyond"<br>[where the address is not local to the current user] | minute

| | |
|---|---|
| paste format | minute ([Date]↓) |
| syntax | minute (when:datetime) : integer |
| definition | Returns the minute of the hour as an integer in the range 0 through 59. |
| example | minute (now ()) => 53 | mod

| | |
|---|---|
| paste format | mod (N, DIVISOR) |
| syntax | mod (dividend:integer, divisor:integer) : integer |
| definition | Returns the remainder (modulus) of the dividend divided by the divisor. |
| example | mod (7, 3) => 1 | month

| | |
|---|---|
| paste format | month ([Date]↓) |
| syntax | month (when:datetime) : integer |
| definition | Returns the month of the year as an integer in the range 1 through 12. |
| example | month (today ()) => 9 | nameKind

| | |
|---|---|
| paste format | nameKind ([From]↓) |
| syntax | nameKind (Iname:string I) : integer |
| definition | Used to validate a name: returns an integer that describes the name:<br>0 String does not correspond to a known username, alias, or distribution list.<br>1 Username in the public address book.<br>2 Alias in the public address book.<br>3 Distribution list in the public address book.<br>4 Username in the user's private address book.<br>5 Alias in the user's private address book.<br>6 Distribution list in the user's private address book. |
| example | nameKind ("everyone") => 2 | now

| | |
|---|---|
| paste format | now () |
| syntax | now () : datetime |
| definition | Returns the current date and time. |
| example | now() => 5-11-91 2:05 PM<br>mid (now(), 10, 1) => : (where now is same as above) | repeat

| | |
|---|---|
| paste format | repeat ("STRING", N) |
| syntax | repeat (source:string, count:integer) : string |
| definition | Returns a string (to a maximum of 255 characters) in which source is duplicated count times. Returns an empty string if count is less than 1. |
| example | repeat ("hello ", 3) => "hello hello hello" | searchCount

| | |
|---|---|
| paste format | searchCount () |
| syntax | searchCount () : integer |
| definition | Returns the number of messages found in a search. Can be used to establish criteria upon which to trigger some action or in string concatenation to pass the returned value. |
| example | If searchCount() = 0 | second

| | |
|---|---|
| paste format | second ([Date]↓) |
| syntax | second (when:datetime) : integer |
| definition | Returns the second of the minute as an integer in the range 0 through 59. |
| example | second (now ()) => 53 |

- 46 - select

| | |
|---|---|
| paste format | select (BOOLEAN, TRUE_VALUE, FALSE_VALUE) |
| syntax | select (condition:boolean, value1:T1, value2:T2) : T1 | T2 |
| definition | Evaluates *condition* and returns value1 if true; otherwise, returns value2. |
| example | alert "You have " & select(countMessages("Inbox") >5, "a lot of", "a few") & " messages in your inbox folder."; | sign

| | |
|---|---|
| paste format | sign (N) |
| syntax | sign (aValue:integer) : integer |
| definition | Returns the sign of the expression, which must be coercible to an integer. |
| example | sign (2) => 1<br>sign (0) => 0<br>sign (-1) => -1 | string

| | |
|---|---|
| paste format | string (N) |
| syntax | string (aValue:value) : string |
| definition | Returns a string representation of the expression (to a maximum of 255 characters), which must be coercible to a string value. If a list is specified, each item in it is coerced to a string value individually and then concatenated in order with the local separator character. |
| example | string (1 + 2) => "3"<br>string ([to]) => "EFlynn,SAdams,KBlack" | sum

| | |
|---|---|
| paste format | sum (N1, N2, N3, ...) |
| syntax | sum (aValue:integer {,anotherValue:integer}...) : integer |
| definition | Returns the sum of the expressions, each of which must be coercible to an integer. If a single expression is specified and it is a list, returns the sum of the list contents. |
| example | sum (4, 2, 9) => 15 | timeValue

| | |
|---|---|
| paste format | timeValue ({Date}↓) |
| syntax | timeValue (aString:string) : time |
| definition | Returns a time value corresponding to the time specified in the argument. |
| example | timeValue ("2 pm") => 2:00 PM | today

| | |
|---|---|
| paste format | today () |
| syntax | today () : date |
| definition | Returns the date at the most recent midnight. |
| example | today () => 5-11-91 | trim

| | |
|---|---|
| paste format | trim ("STRING") |
| syntax | trim (source:string) : string |
| definition | Removes leading, trailing, and consecutive whitespace characters from a string; embedded consecutive whitespace characters are replaced by a single space character. |
| example | trim (" a  b  c ") => "a b c" | true  A built-in value.

upper

| | |
|---|---|
| paste format | upper ("STRING") |
| syntax | upper (aString:string) : string |
| definition | Converts all letters in the string argument to their uppercase equivalent. |
| example | upper ("Time's Up") => "TIME'S UP" | username

| | |
|---|---|
| paste format | username () |
| syntax | username ([address:string]) : string |
| definition | Returns the username portion of the specified address. If no argument is entered, returns the name of the logged-in user. Strips the workgroup component from an MHS address. Returns a null string if the address is not formatted correctly. |
| example | username ("MGold @ beyond") => "MGold"<br>username ("EFlynn") => "EFlynn" | value

| | |
|---|---|
| paste format | value ("STRING") |
| syntax | value (aValue:string) : integer |
| definition | Returns the numerical equivalent of the string argument, which must be coercible to an integer. |
| example | value ("123") => 123 | year

| | |
|---|---|
| paste format | year ([Date]↓) |
| syntax | year (when:datetime) : integer |
| definition | Returns the year from the given date/time. |
| example | year (today ()) => 1991 |

- 48 -

What is claimed is:

1. Apparatus for connection to a network for sending and receiving messages to and from said apparatus and at least one other network connected device in accordance with a plurality of rules, comprising:

a rule processor for processing messages at said apparatus in accordance with at least one of said plurality of rules;

each of said rules having a first portion consisting of an event indicia, a second portion consisting of a condition indicia, and a third portion consisting of an action indicia;

an event generator being operative to indicate an occurrence of one of a plurality of events;

said rule processor being operative to determine which of said rules have an event indicia corresponding to the occurrence of one of the plurality of events, to invoke only the rules for which the event portion corresponds to the occurrence of the event, and to evaluate the second portion of each invoked rule, to determine whether the condition indicia are met by the message;

an action processor operative to invoke an action with respect to any of said messages in accordance with said third portion of each of said invoked rules for which the condition indicia are met; and an event manager having at least one event queue and operative to create event records in accordance with said plurality of events to store in said at least one event queue, and further operative to retrieve event records from said at least one event queue, wherein said at least one event queue comprises a persistent event queue for storing events which persist across invocations of said rule processor and a non-persistent event queue for storing events that do not persist across invocations of sadi rule processor.

2. The apparatus of claim 1 wherein said persistent event queue is resident on a mass storage device.

3. The apparatus of claim 1 wherein said non-persistent event queue is resident in an apparatus resident memory.

4. The apparatus of claim 1 wherein said event manager synchronizes said persistent event queue and said non-persistent event queue to effect merger into a virtual single queue.

5. The apparatus of claim 1 wherein ones of said plurality of events stored in said persistent event queue are events selected from a group of occurrences consisting of: a new message, a read message, a filed message, a periodic event, and a timed event, and ones of said plurality of events stored in said non-persistent event queue are events selected from a group of occurrences consisting of: an application startup, an application exiting, a button event and an inter-application communication event.

* * * * *